US012004696B2

(12) United States Patent
Walker et al.

(10) Patent No.: US 12,004,696 B2
(45) Date of Patent: Jun. 11, 2024

(54) DYNAMIC DISPENSING SYSTEM

(71) Applicant: Champion Industries, Inc., Winston-Salem, NC (US)

(72) Inventors: Nick Walker, Winston-Salem, NC (US); Thomas J. Walker, Emerald Isle, NC (US)

(73) Assignee: CHAMPION INDUSTRIES, INC., Winston-Salem, NC (US)

( * ) Notice: Subject to any disclaimer, the term of this patent is extended or adjusted under 35 U.S.C. 154(b) by 524 days.

(21) Appl. No.: 17/012,409

(22) Filed: Sep. 4, 2020

(65) Prior Publication Data
US 2021/0059497 A1 Mar. 4, 2021

Related U.S. Application Data

(60) Provisional application No. 62/895,668, filed on Sep. 4, 2019.

(51) Int. Cl.
*A47L 15/00* (2006.01)
*A47L 15/42* (2006.01)
(Continued)

(52) U.S. Cl.
CPC ....... *A47L 15/0055* (2013.01); *A47L 15/4219* (2013.01); *A47L 15/4297* (2013.01);
(Continued)

(58) Field of Classification Search
CPC ............. A47L 15/0055; A47L 15/4219; A47L 15/4297; A47L 15/44; A47L 2401/023;
(Continued)

(56) References Cited

U.S. PATENT DOCUMENTS 4,756,321 A * 7/1988 Livingston .......... A47L 15/0055
68/12.18
2014/0053881 A1* 2/2014 Dickey ............... A47L 15/4418
73/304 R

FOREIGN PATENT DOCUMENTS

CN 202663316 U * 1/2013
CN 110412083 A * 11/2019

OTHER PUBLICATIONS

"UMP 100/200 Digital Instruction Manual", Knight LLC, Knight Index Corporation, dated Aug. 28, 2008, pp. 1-12.

* cited by examiner

*Primary Examiner* — Benjamin L Osterhout
(74) *Attorney, Agent, or Firm* — Alston & Bird LLP

(57) ABSTRACT

Provided herein are systems, methods, apparatus, and computer program products relating to a dynamic dispensing system. Embodiments may include a dishwasher including a washing chamber, a water supply, an additive supply, and a plurality of fluid supply lines that provide fluid communication between the water supply and the washing chamber and the additive supply and the washing chamber. The dishwasher includes one or more pumps that direct additives stored in the additive supply to the washing chamber and water from the water supply to the washing chamber. The dishwasher further includes a tank sensor within the washing chamber and a controller communicably coupled to the controller. The controller may receive and analyze signals from the tank sensor to determine an additive concentration within the washing chamber and cause additive or water to be added to the washing chamber in response to the signal.

10 Claims, 18 Drawing Sheets

(51) Int. Cl.
   *A47L 15/44* (2006.01)
   *B67D 3/00* (2006.01)
   *G01N 27/06* (2006.01)

(52) U.S. Cl.
   CPC ............ *A47L 15/44* (2013.01); *B67D 3/0003* (2013.01); *G01N 27/06* (2013.01); *A47L 2401/023* (2013.01); *A47L 2501/01* (2013.01); *A47L 2501/07* (2013.01)

(58) Field of Classification Search
   CPC ............. A47L 2501/01; A47L 2501/07; B67D 3/0003; G01N 27/06
   See application file for complete search history.

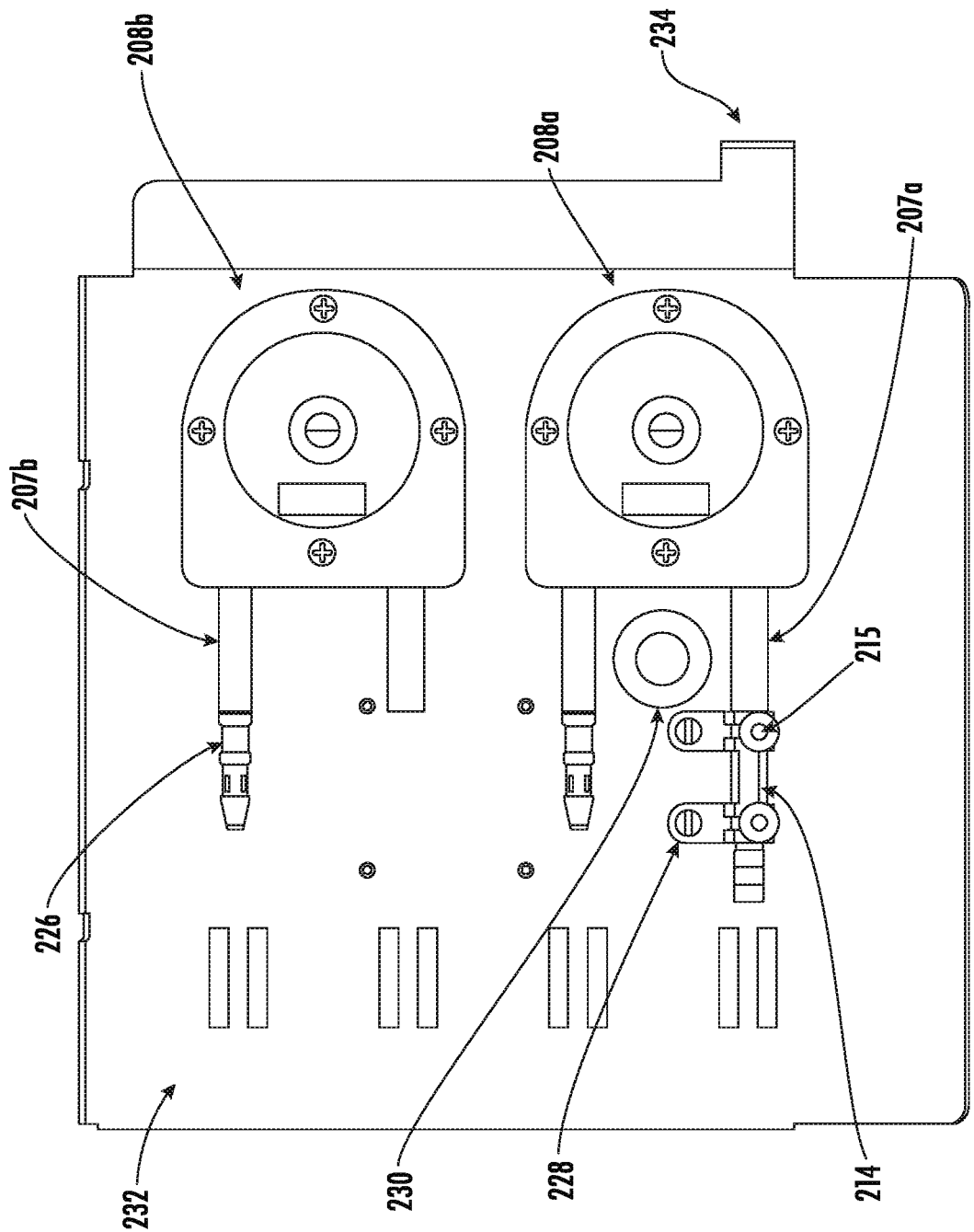

DYNAMIC DISPENSING SYSTEM

CROSS REFERENCE TO RELATED APPLICATIONS

This application incorporates U.S. Provisional Application No. 62/895,668, filed Sep. 4, 2019, by reference herein in its entirety.

FIELD OF THE INVENTION

Embodiments of the present invention relate generally to dishwashing devices, and, in some embodiments, to commercial dishwashers and associated dispensing systems.

BACKGROUND

Commercial dishwashers are used in a variety of industries (e.g., restaurants, college campuses, hospitals, and the like) to clean and sterilize dishes, cutlery, pots and pans, and associated instruments for these industries. For example, restaurants may employ commercial dishwashers that support or otherwise receive dishware therein (e.g., inside a washing container, tub, etc.) and apply detergents to this dishware in order to remove items attached to the dishware as well as to sterilize (e.g., via chemical reaction, temperature, etc.) the dishware. In these applications, commercial dishwashers are used over smaller household appliances due to the increased cleaning capacity and sterilization provided. Applicant has identified a number of deficiencies and problems associated with commercial dishwashers. Through applied effort, ingenuity, and innovation, many of these identified problems have been solved by developing solutions that are included in embodiments of the present invention, many examples of which are described in detail herein.

BRIEF SUMMARY

As described above, conventional dishwashing devices rely upon the application of detergent and/or temperature to properly sterilize dishware (e.g., plates, silverware, cutlery, etc.) for reuse. Traditionally, a commercial dishwasher defines a washing chamber or the like for receiving dishware therein may receive one or more different additives for facilitating the washing cycle. These additive sources may include supplies of premixed detergent (e.g., water and concentrated detergent) for supplying to the dishwasher such that adjustment of the detergent concentration is either limited or unavailable. In other instances, these conventional detergent sources are supplied with a separate water source and concentrated detergent source with a set concentration determined at installation. As such, adjustment of detergent concentration requires servicing this separate detergent source, often by requesting the assistance of outside vendor. Furthermore, the components of conventional systems employ unsophisticated controls (e.g., requiring third-party servicing), unsophisticated detergent systems (e.g., concentration determined at installation alone), and multiple distinct components (e.g., not housed within a single appliance). In this way, conventional dishwashing devices provide only rigid detergent concentration adjustment, if any, resulting in the decreased usability of the commercial dishwasher and increased operating costs.

To the extent that conventional dishwashing devices provide for detergent dispensing, these devices fail to properly account for the variability of the concentration within the washing chamber. Due to the disjointed nature of commercial dishwashing devices using separate detergent sources without in situ measuring and dispensing, these systems fail to account for the effect of contaminants and real-world conditions on the conductivity within the washing chamber during use. In particular, these traditional systems may only disperse a set amount of detergent without analyzing the actual conductivity within the washing chamber or the properties of the water being used in a particular machine. By way of example, the water used by dishwashers (e.g., tap water or the like) may include contaminants, minerals, salts, etc. that increase the conductivity of the fluid within the washing chamber, which water may vary building-to-building or day-to-day. During a wash cycle, the conductivity of the fluid may further change independent of the input of detergents (e.g., an additive) due to the containment concentration of the fluid supplied to the dishwasher and/or due to containments removed from the dishware. As such, these conventional systems may provide too little detergent or too much detergent by failing to account for the dynamic conductivity changes within the washing chamber.

To solve these issues and others, example implementations of embodiments of the present invention may utilize a dispensing system that provides dynamic detergent concentration adjustment within a washing chamber. The system includes sensors positioned within the washing chamber in conjunction with a programmable logic controller (PLC) to determine the detergent concentration within the washing chamber in situ and adjust this concentration by pumping additional water and/or detergent into the washing chamber. In doing so, such example implementations increase adjustability, optimize detergent usage, and minimize operating costs. The systems described herein may determine an additive concentration as described hereafter when the water containment concentration is at a baseline level in the machine (e.g., the water is clean or prior to a wash cycle) and ignore conductivity determinations when the fluid within the washing chamber includes additional containments (e.g., during or immediately following a wash cycle). In such embodiments, the system may follow a process including dispensing a known amount of chemistry, confirming the presence of the chemistry being dispensed, and determining the quantity of detergent mixed with the wash water at a time when the water is at its baseline, clean state. Similar systems may also be implemented for other additives, such as rinse aid. As such, the embodiments of the present application have achieved a system in which complex control systems monitor and adjust detergent concentration utilizing only components supported in a single system (e.g., without distinct, separated components). Furthermore, as described hereafter, the sophisticated systems described herein may be integrated into a single housing of an appliance with all of the necessary dispensing and measuring equipment to operate the unit independent of any outside control or supplies apart from tap water and with feedback control of the detergent system, in some instances, being operated by the primary controller of the appliance.

Systems, apparatuses, methods, and computer program products are disclosed herein for providing dynamic additive adjustment. The example embodiments of the present disclosure are described herein with reference to a commercial dishwasher configured to implement one or more elements of the dynamic dispensing system. The present disclosure, however, contemplates that the devices, systems, apparatuses, methods, and computer program products described herein may be applicable to other implementations in which additive concentration adjustment is desired. In an example embodiment, a dishwasher may be provided that includes a washing chamber configured to receive one or more items for washing therein and a water supply configured supply water to the washing chamber. The dishwasher may include an additive supply configured store at least one additive; a plurality of fluid supply lines configured to provide fluid communication between the water supply and the washing chamber and the additive supply and the washing chamber; a pump configured to direct additive stored in the additive supply to the washing chamber via at least one of the fluid supply lines; a controller communicably coupled to the pump and the water supply; and a tank sensor positioned within the washing chamber and communicably coupled to the controller. In some embodiments, the controller may be configured to receive a signal from the tank sensor and analyze the signal from the tank sensor to determine an additive concentration within the washing chamber. In an instance in which the additive concentration fails to satisfy a minimum concentration threshold, the controller may cause additive to be added to the washing chamber. In an instance in which the additive concentration exceeds a maximum concentration threshold, the controller may cause water to be added to the washing chamber.

In some embodiments, the controller may be configured to receive a signal from the tank sensor; analyze the signal from the tank sensor to determine an additive concentration within the washing chamber; and, in an instance in which the additive concentration fails to satisfy a minimum concentration threshold, cause additive to be added to the washing chamber (e.g., with or without monitoring a maximum additive concentration threshold). By way of example, some dishwasher implementations utilize several and/or iterative rinse cycles (e.g., with water and/or rinse aid) such that the additive concentration, for example detergent, is similarly diminished over time. As such, in some embodiments, the controller may only be configured for determining an additive concentration within the washing chamber as related to the minimum concentration threshold. Unlike conventional dishwashing devices, the controller as described herein may therefore account for the dynamic variability of the additive concentration and associated conductivity within the washing chamber. In some embodiments, the dishwasher may include an in-line sensor positioned in communication with at least one of the fluid supply lines, and the controller may be further configured to receive a signal from the in-line sensor and analyze the signal from the in-line sensor to identify the presence of detergent within the fluid supply line.

In some embodiments, the dishwasher may include signal conditioning circuitry communicably coupled with the controller configured to rectify an alternating current (AC) signal received from the tank sensor to a direct current (DC) signal for transmission to the PLC. The signal conditioning circuitry may be configured to direct a modified sine wave excitation signal to the tank sensor. Computer program products, media, and related methods may be provided for carrying out one or more functions of the dishwasher or any component thereof as described herein.

In some example embodiments, a sensor assembly may include a housing defining a conduit extending therethrough, wherein the conduit defines a length. The sensor assembly may include at least two electrodes spaced along the length of the conduit, and a signal conditioner configured to apply an excitation signal to the at least two electrodes such that a current is configured to flow between the at least two electrodes in an instance in which a conductive fluid is present in the conduit between the at least two electrodes.

In some embodiments, the at least two electrodes each define a generally cylindrical shape and extend through the conduit in a direction perpendicular to the length of the conduit. In some embodiments, the excitation signal is a modified sine wave signal. In other embodiments, the excitation signal is a bipolar square wave.

In some embodiments, a modular dispensing system may be provided that includes a back plate, the back plate configured to engage and support at least one pump, at least one motor configured to drive the at least one pump, and at least one sensor. The back plate may include at least one mounting member configured to engage a housing of a dishwasher.

In any embodiment, the elements of the sensor assembly, controller, modular dispensing system, or the like may be supported by or formed integral to a housing of the dishwasher. Said differently, the washing chamber, the additive supply, at least a portion of the plurality of fluid supply lines, the pump, the controller, and/or the tank sensor may be supported within the housing of a dishwasher such that the dishwasher achieves dynamic additive adjustment within a single appliance package, while only minimal external connections, such as electricity and in some embodiments water supply, are used. In some embodiments, a water tank may be present within the housing.

By providing a fully integrated system, the devices described herein may provide functionality regarding additive concentration unavailable to conventional dishwashing devices that are supplied with a separate water source and concentrated detergent source with a set concentration determined at installation. The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 3B-3E are various views of a portion of the dynamic dispensing system of FIG. 2 according to some embodiments;

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Figure 1A:
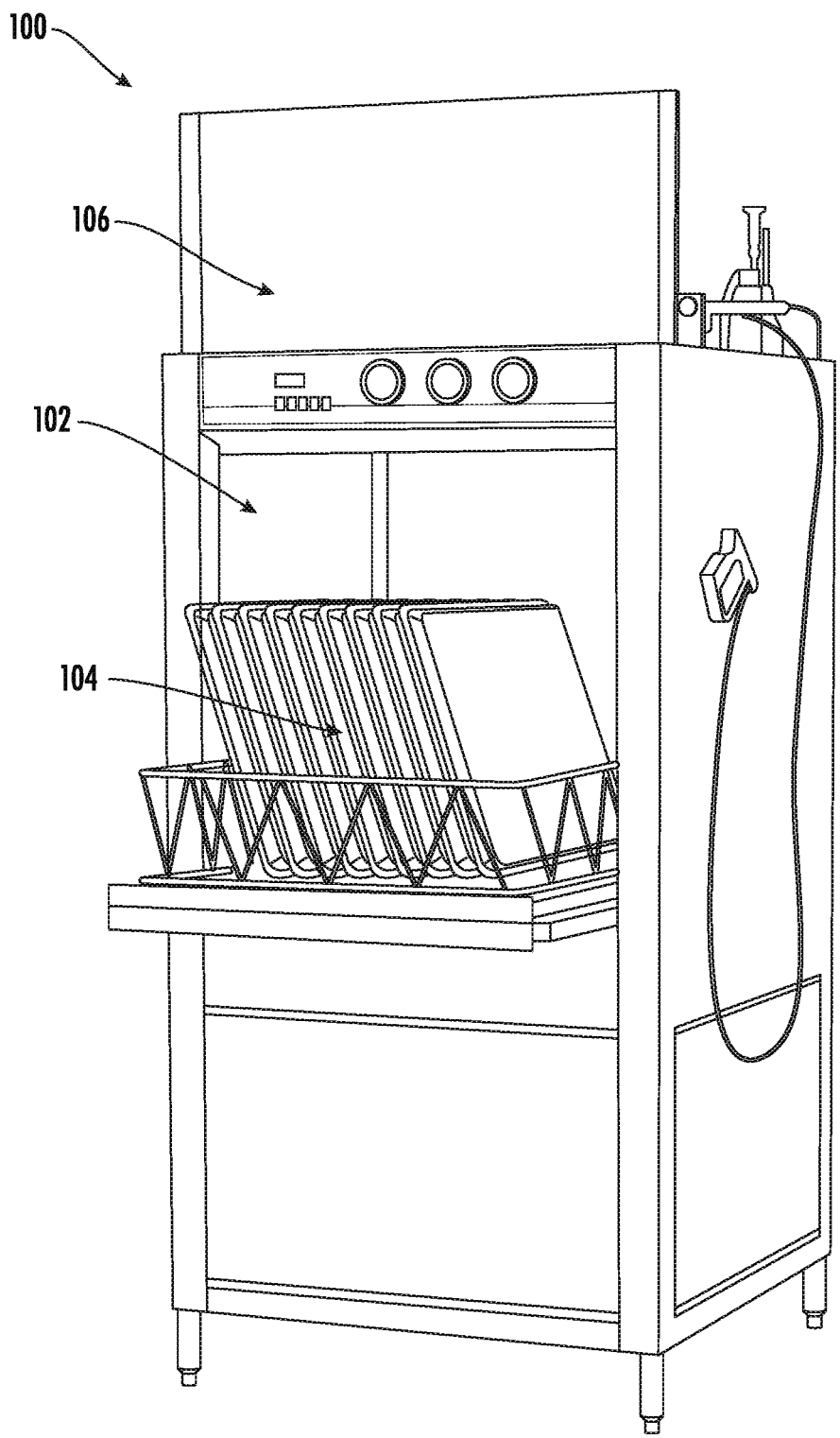
FIGS. 1A-1B are perspective views of example dishwashers in which dispensing systems according to some example embodiments described herein are implemented.
Figure 1B:
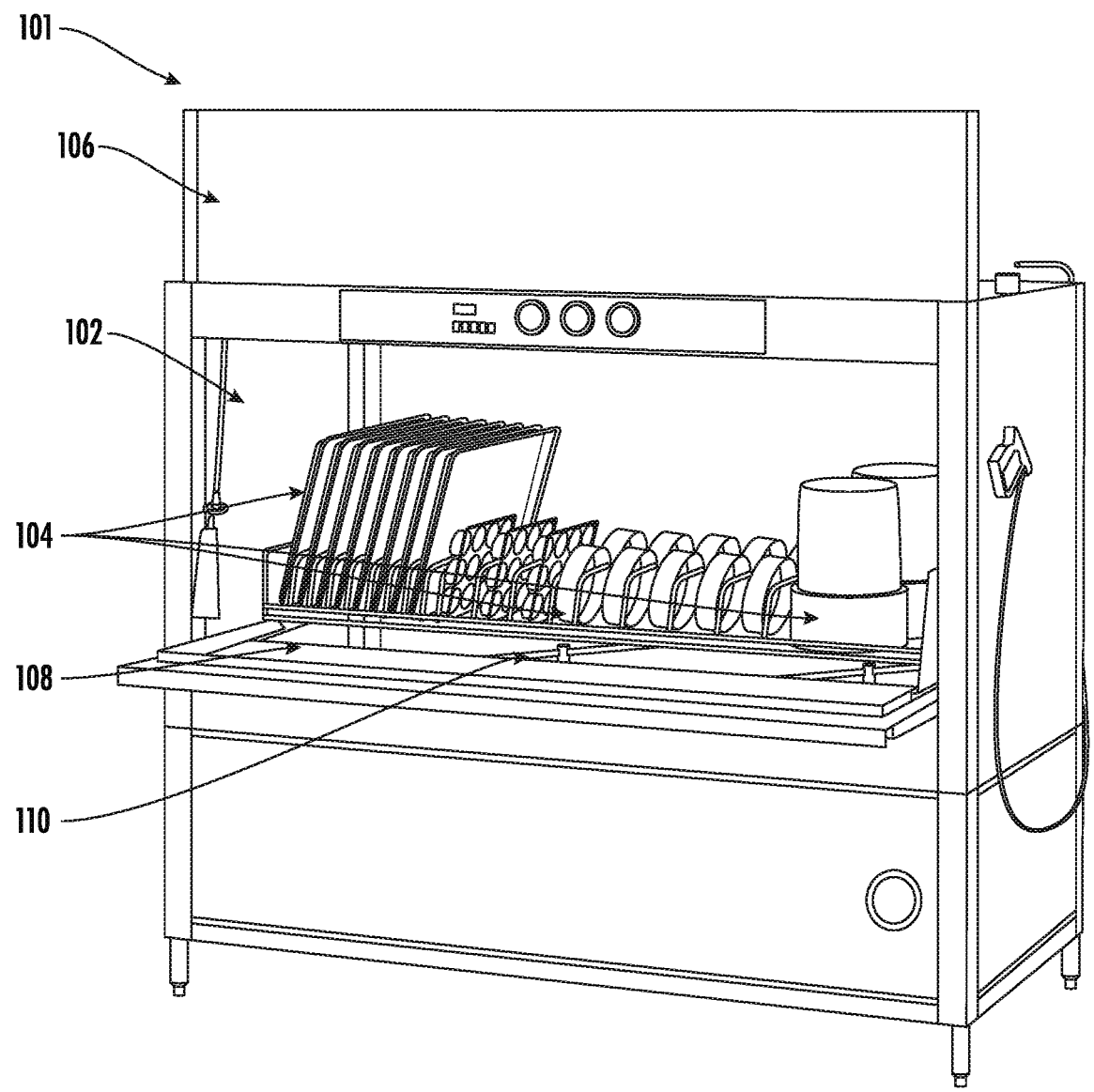

With reference to FIGS. 1A-1B, example commercial dishwashers 100, 101 are illustrated for implementing the dynamic dispensing system of the present disclosure. The depicted dishwashers include door-type commercial dishwashers. As shown, dishwashers 100, 101 may include a housing that defines a washing chamber 102 (e.g., enclosure, or the like) configured to receive dishware 104 therein, and the washing chamber 102 may define a tank 108 configured to collect the process water (e.g., for circulation or draining). As shown, the dishwasher 100, 101 may include any number of racks, shelves, drawers, slots, or the like configured to support or otherwise receive dishware 104 within the washing chamber 102 of the dishwasher 100, 101. Furthermore, the washing chamber 102 may be dimensioned (e.g., sized and shaped) to receive dishware 104 of any size, type, shape, or configuration based upon the intended application and may also be configured to support any item requiring detergent based sterilization methods. The dishwasher 100, 101 may include one or more spray devices 110 for distributing and circulating the washing liquid within the washing chamber 102. In some embodiments, the dishwasher 100, 101 may include one or more doors 106 configured to selectively seal the washing chamber 102 during operation. In the dishwashers 100, 101 of FIG. 1, the doors 106 may translate and/or rotate between an open position configured to provide access to the interior of the washing chamber 102 (e.g., to add or remove dishware 104) and a closed position in which the washing chamber 102 is substantially sealed (e.g., watertight) from an external environment. In the closed position, detergent, water, washing fluid, etc. may be dispersed into the washing chamber 102 (e.g., via a spray device 110) so as to clean and/or sterilize the dishware 104 therein.

With continued reference to FIGS. 1A-1B, door type commercial dishwashers are illustrated for implementing some embodiments described herein. The present disclosure, however, contemplates that the dynamic dispensing system may be equally applicable to under counter dishwashers, rack conveyors, flight machines, circular conveyors, bi-line conveyor systems, or any related system. Furthermore, while described herein with reference to commercial applications, for example in restaurants, the present disclosure contemplates that the dynamic dispensing system may also be applicable to household dishwashers and/or other consumer appliances.

Dynamic Dispensing System

Figure 2:
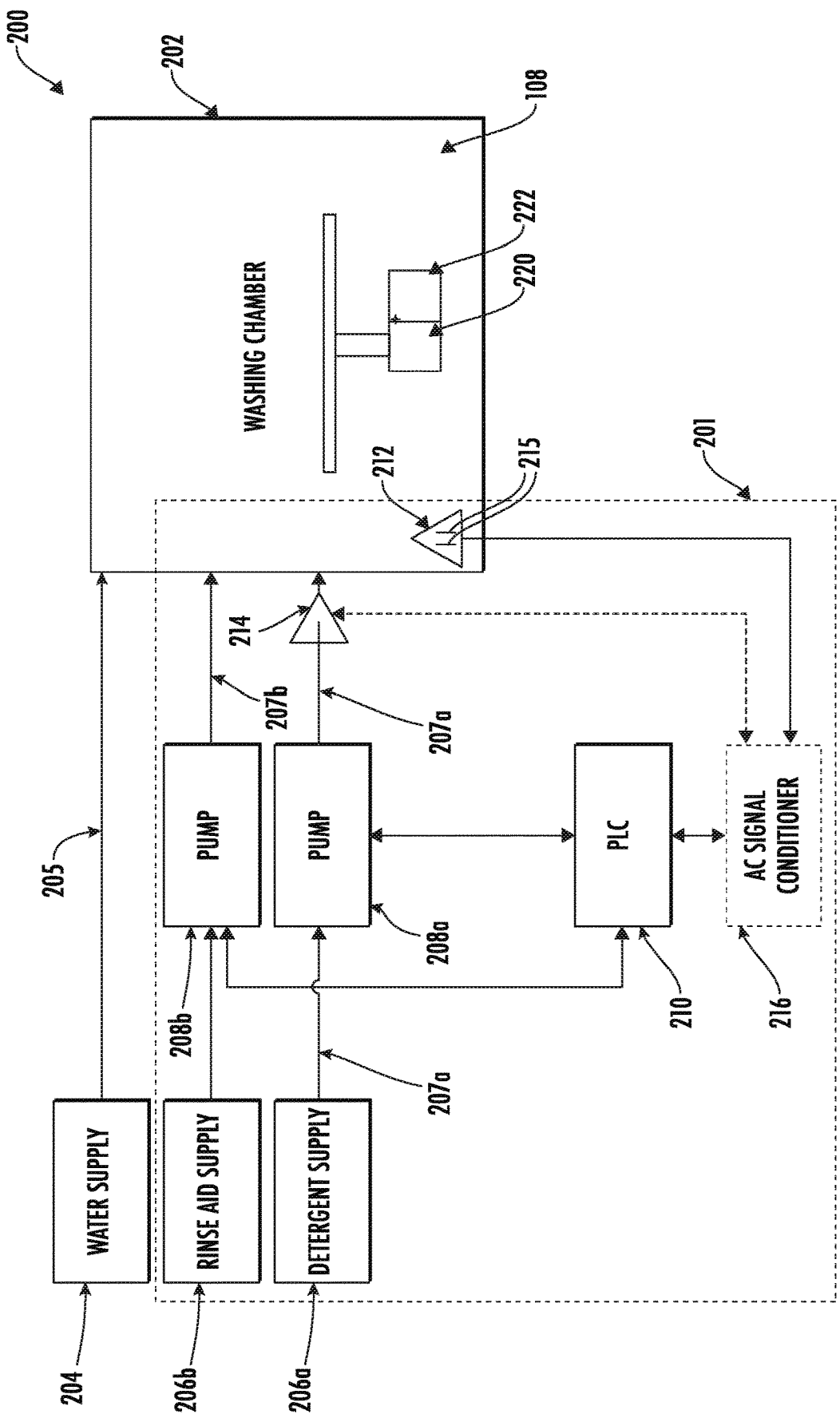
FIG. 2 is a schematic depiction of an example dynamic dispensing system according to some embodiments.

With reference to FIG. 2, an example diagram of a dishwasher 200 having a dispensing system 201 is illustrated. In the depicted embodiment, the dishwasher 200 includes a dispensing system 201, washing chamber 202, a water supply 204, a spray device 110, a circulation pump 220, and a drain pump 222. The water supply 204 may define one or more valves connected to a water inlet configured to supply the washing chamber 202 via one or more supply lines 205. In some embodiments, the dispensing system 201 may include an additive supply 206 (e.g., detergent supply 206a and rinse aid supply 206b), a plurality of additive supply lines 207 (e.g., supply lines 207a, 207b), one or more pumps 208 (e.g., pumps 208a, 208b), a programmable logic controller ("PLC") 210, a tank sensor 212, one or more optional in-line sensors 214, and a signal conditioner 216. As described above, the washing chamber 202 may be configured to receive dishware (e.g., dishware 104) therein and may be dimensioned (e.g., sized and shaped) to receive dishware of any size or configuration based upon the intended application of the dishwasher 200. As would be evident to one of ordinary skill in the art in light of the present disclosure and as described hereinafter, the washing chamber 202 may, during operation, receive fluid (e.g., water and one or more additives) in order to clean the dishware therein. Furthermore, the fluid within the washing chamber 102 may include detergent solutions, rinse aids, descaling solutions, compounds, concentrates, etc. configured to promote cleaning of the dishware and the operation of a wash cycle. As described above, during a wash cycle, the conductivity of the fluids within the washing chamber 102 may vary due to the containments within the water supplied to the washing chamber 102 as well as due to the containments removed from the dishware within the washing chamber 102.

The dishwasher 200 as shown may include a water supply 204, which may be configured to store water therein for transmission to the washing chamber 202. As will be described hereafter, the water from the water supply 204 may be directed (e.g., transmitted, moved, conveyed, etc.) to the washing chamber 202 so as to dilute detergent within the washing chamber 202 during operation, rinse the dishware within the washing chamber 202, and the like. In some embodiments, the water supply 204 defines one or more valves for admitting water to the washing chamber 202. In some embodiments, the water supply 204 may comprise a tank or enclosure configured to store water as part of a dishwasher (e.g., a refillable tank within the dishwasher 200). In other embodiments, the water supply 204 may comprise a water line (e.g., water pipe, hose, etc.) connecting the dishwasher 200 to a fresh water supply (e.g., a building water line) so as to provide water to the dishwasher. In such an embodiment, the water supply 204 may define one or more water valves, pumps, connections, or the like configured to provide fluid communication between the dishwasher 200 and a fresh water supply. For example, in some embodiments a pump may direct fresh water into the tank, and in some embodiments, the building pressure from a municipal water supply may feed the water directly via one or more valves.

The dishwasher 200 may also include one or more additive supplies, collectively referred to herein with reference numeral 206. In some embodiments, the additive supplies 206 may include a detergent supply 206a and/or rinse aid supply 206b configured to respectively store detergent and/or rinse aid therein for transmission to the washing chamber 202 during a wash cycle. As described herein, the detergent stored within the detergent supply 206a may be directed (e.g., transmitted, moved, conveyed, etc.) to the washing chamber 202 (e.g., via pump 208a) so as to provide the active cleaning or sterilization agent within the washing chamber 202 during operation. In some embodiments, the rinse aid stored within the rinse aid supply 206b may be directed (e.g., transmitted, moved, conveyed, etc.) to the washing chamber 202 (e.g., via pump 208b) so as to improve rinsing (e.g., via one or more surfactants) within the washing chamber 202 during operation. The present disclosure contemplates that any additives applicable for dishware, warewashing, or other commercial cleaning or sanitizing operations may be used in the additive supply 206 of the system 201. Furthermore, although described herein with reference to a concentrated additive (e.g., delivered to the washing chamber 202 and diluted by water from the water supply 204), the present disclosure contemplates that the detergent used by the system 201 may be of any concentration based upon the intended application of the system 201.

Similar to the water supply 204 described above, the additive supplies 206 (e.g., detergent supply 206a and/or rinse aid supply 206b) may be formed integrally with the washing chamber 202 or associated dishwasher 200 (e.g., tank 208 or enclosure configured to store detergent as part of a dishwasher), a feature not found in conventional systems. In some embodiments, one or more the additive supplies 206 may be in separate containers (e.g., while remaining supported within in a single housing of the dishwasher 200), which may be connected to the dishwasher 200 via fluid lines 207. In some embodiments, the dispensing system 201 may define one or more pumps 208, valves, connections 207, or the like configured to provide fluid communication between the dishwasher 200 and a detergent supply 206a, rinse aid supply 206b, or other additive supply.

Figure 3A:
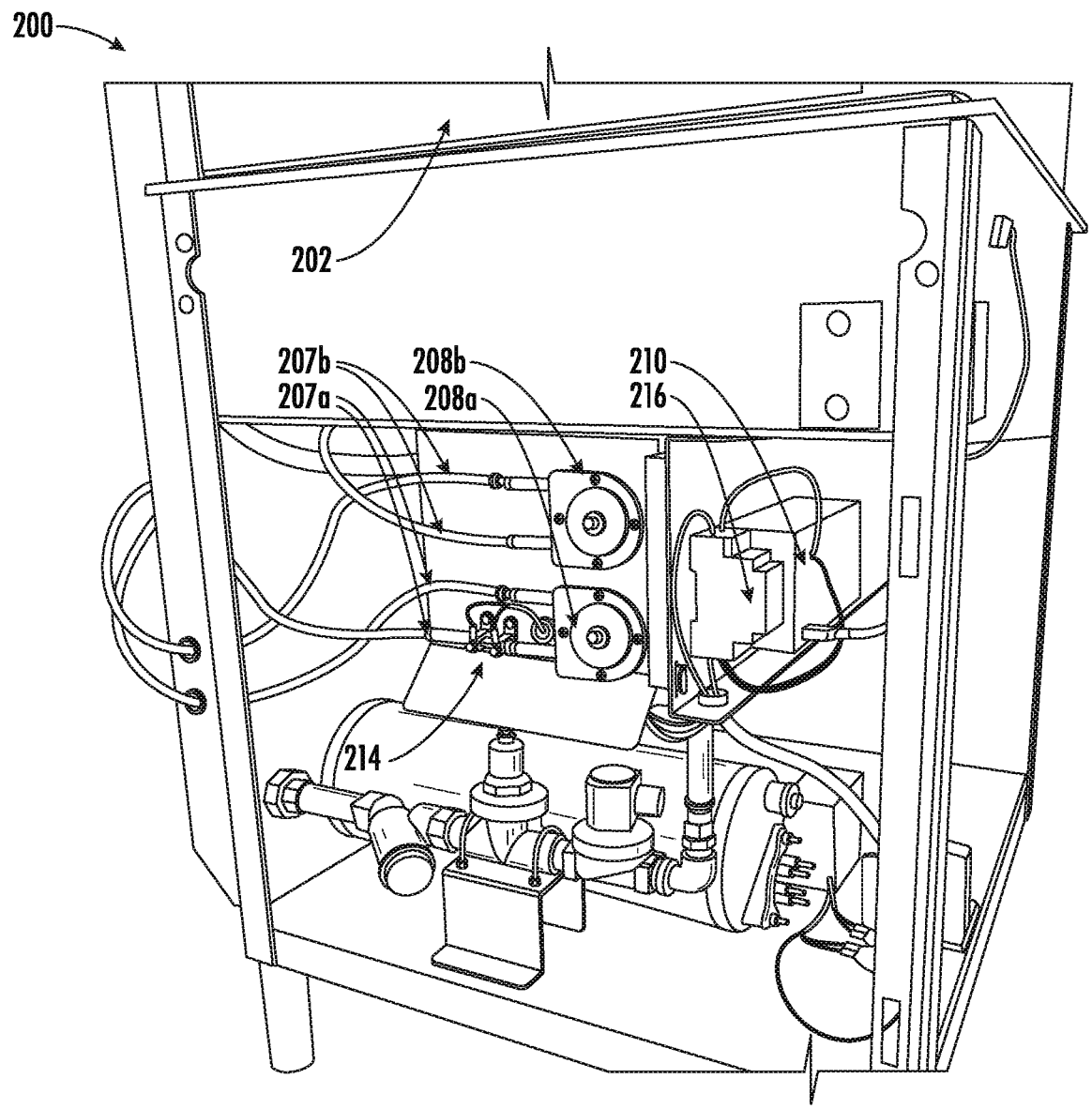
FIG. 3A is a perspective view of a portion of the dynamic dispensing system of FIG. 2 in conjunction with the example dishwasher of FIG. 1A according to some embodiments.

With continued reference to FIG. 2, the dishwasher 200 may include a plurality of fluid supply lines 205, 207a, 207b configured to provide fluid communication between the water supply 204 and the washing chamber 202 and the additive supplies 206a, 206b and the washing chamber 202, respectively. As shown, the fluid supply line 205 may provide fluid communication between the water supply 204 and the washing chamber 202, a first additive fluid supply line 207a may provide fluid communication between the detergent supply 206a and the washing chamber 202 via a first pump 208a, and a second additive fluid supply line 207b may provide fluid communication between the rinse aid supply 206b and the washing chamber 202 via a second pump 208b. In some embodiments, the pumps 208a, 208b may be of different sizes and capacities as needed (e.g., a detergent pump may be larger than a rinse aid pump). As illustrated in FIG. 3A described hereafter, the fluid supply lines 205, 207a, 207b in some embodiments may be independent from one another such that water transmitted by the fluid supply line 205 and additives transmitted by the respective additive fluid supply lines 207a, 207b (as facilitated by the pumps 208a, 208b) may each mix only in the washing chamber 202. Said differently, the washing chamber 202 may be in fluid communication with the fluid supply line 205 via a valve, outlet, connection, or the like separate from another valve, outlet, connection, or the like configured to provide fluid communication with the detergent fluid supply line 207a and the washing chamber 202, each of which may be separate from a third valve, outlet, connection, or the like configured to provide fluid communication with the rinse aid fluid supply line 207b and the washing chamber 202. In other embodiments, however, the fluid supply lines may be in fluid communication with one another (e.g., merge at a fluid juncture, joint, etc.) such that a combination of water, detergent, and/or rinse aid is provided to the washing chamber 202 at a single location (e.g., valve, connection, etc.). The present disclosure further contemplates that the dishwasher 200 may include any number of fluid supply lines 205, 207 in fluid communication with the washing chamber 202 at any position or orientation within the washing chamber 202.

The dishwasher 200 may also include one or more pumps 208 configured to deliver one or more fluids (e.g., additives) to the washing chamber 202, which are collectively referred to herein with reference numeral 208. In some embodiments, the one or more pumps 208 may include a first additive pump 208a associated with a first additive fluid supply 207a connecting a detergent supply 206a to the washing chamber 202. In some embodiments, the one or more pumps 208 may include a second additive pump 208b associated with a second additive fluid supply 207b connecting a rinse aid supply 206b to the washing chamber 202. As would be evident to one of ordinary skill in the art in light of the present disclosure, the pumps 208 may be configured to provide suction, generate negative pressure within the additive supplies, positive displacement, or otherwise cause fluid transfer between the additive supplies 206 and the washing chamber 202. As such, the present disclosure contemplates that the pump 208 may comprise one or more valve-less pumps, stem pumps, gravity pumps, velocity pumps, impulse pumps, positive displacement pumps, or any combination thereof. In some embodiments, such as the embodiment depicted in FIG. 3A, the pumps 208 may be peristaltic pumps. In some embodiments, the water supply 204 may deliver fresh water to the washing chamber 202 via the water pressure of a municipal water supply. In some embodiments, a pump (not shown) may be used to deliver fresh water to the washing chamber 202.

The dispensing system 201 may further include a tank sensor 212 positioned within the washing chamber 202 (e.g., within the tank 108 shown in FIG. 1) and electrically coupled with the controller 210 described hereafter. The tank sensor 212 may comprise a conductivity/resistivity sensor configured to determine a resistivity (and by a reciprocal relationship, the conductivity) of the fluid solution within the washing chamber 202. In some embodiments, the tank sensor 212 may define electrodes separated by a predetermined distance. The tank sensor 212 may conduct an electric current between the electrodes via the fluid solution in the washing chamber to determine the resistivity of the fluid and characterize the type and/or concentration of additives dissolved in water. In operation, a potential may be applied across the electrodes (e.g., via a power supply) and the current passing between the electrodes may be measured. The current flowing between the electrodes is proportional to the conductivity of the fluid solution within the washing chamber 202 (inversely proportional to resistivity). In some embodiments, the current may be converted to a voltage value via a signal conditioner as described hereafter to be transmitted to a PLC (e.g., controller 210) for further control and processing. As is further described hereafter, an alternating current (AC) power source may be applied between the electrodes to prevent complete ion migration (e.g., plating) of one of the electrodes in the tank sensor 212. In some embodiments, a direct current (DC) power source may be applied to the electrodes with a bipolar square wave to similarly prevent complete ion migration. The tank sensor 212 may be positioned at any location within washing chamber 202 so long as sufficient contact with the fluid solution therein is provided. In some embodiments, the electrodes may be stainless steel.

With continued reference to FIG. 2, the dispensing system 201 may also include a controller 210 (e.g., a PLC) communicably coupled to the pump 208, tank sensor 212, and in-line sensor 214 if present. Operation of the controller 210 is described hereafter with reference to FIGS. 6-7 and 10-13. The controller 210 may include circuitry, processors, or the like configured to perform some or all of the processes (e.g., dynamic additive adjustment) described herein, and may be any suitable type of processing device. In this regard, the controller 210 may be embodied by any of a variety of devices. For example, the controller 210 may be configured to receive and/or transmit data (e.g., sensor data) via one or more communication interfaces and input/output devices and may include one or more processors, transitive and non-transitive memories, and any other necessary computing hardware and software configured to perform the operations described herein. For example, the controller 210 may be configured to execute instructions stored in a non-transitory, computer readable memory or otherwise accessible to one or more processors of the controller 210. Whether configured by hardware or by a combination of hardware with software, the controller 210 may represent an entity capable of performing operations according to an embodiment of the present invention while configured accordingly.

As described above, the controller 210, dispensing system 201, and/or the additive supplies 206 (e.g., detergent supply 206a and/or rinse aid supply 206b) may be formed integrally with the washing chamber 202 or associated dishwasher 200. Said differently, the controller 210, dispensing system 201, and/or the additive supplies 206 may be supported or otherwise housed by a housing of the dishwasher 200. In such example embodiments, the integral additive controls and/or supplies do not require additional plumbing, mounting devices, or the like in order to operate. In doing so, such example implementations increase adjustability, optimize detergent usage, and minimize operating costs as compared to conventional systems. In some embodiments, every component necessary for operation of the dishwasher, apart from external supplies such as external electrical and water supply (if used) lines, may be integrated as part of a single appliance, and may be held within or supported on a single housing.

Figure 4:
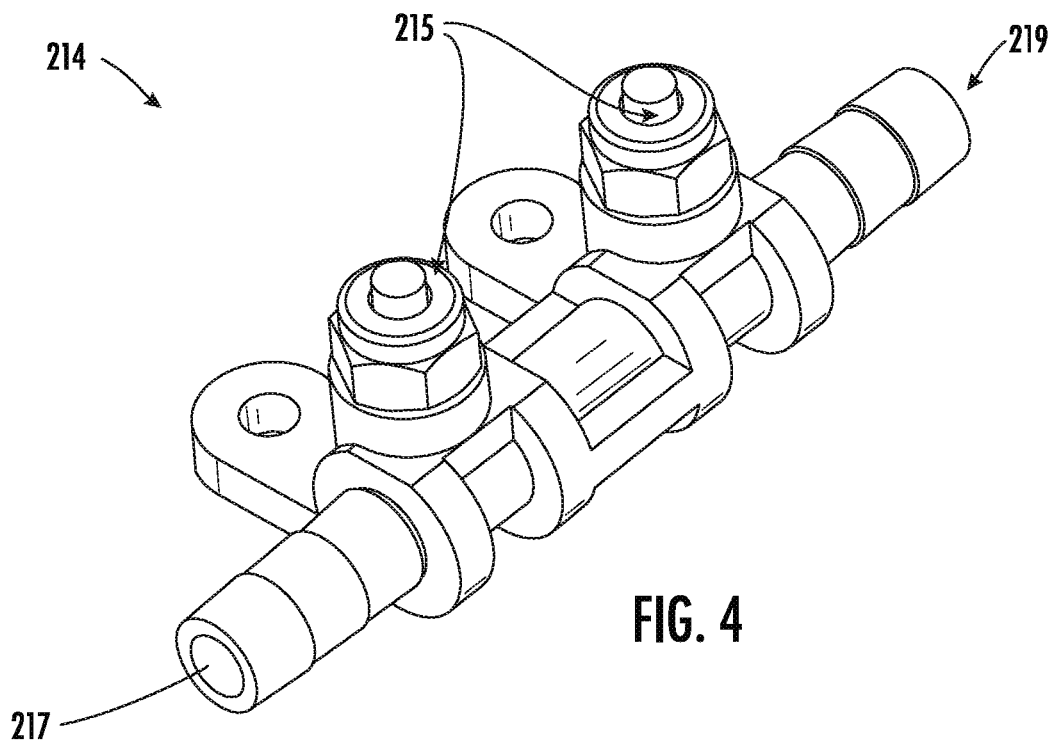
FIG. 4 is a perspective view an in-line sensor according to some embodiments.
Figure 5:
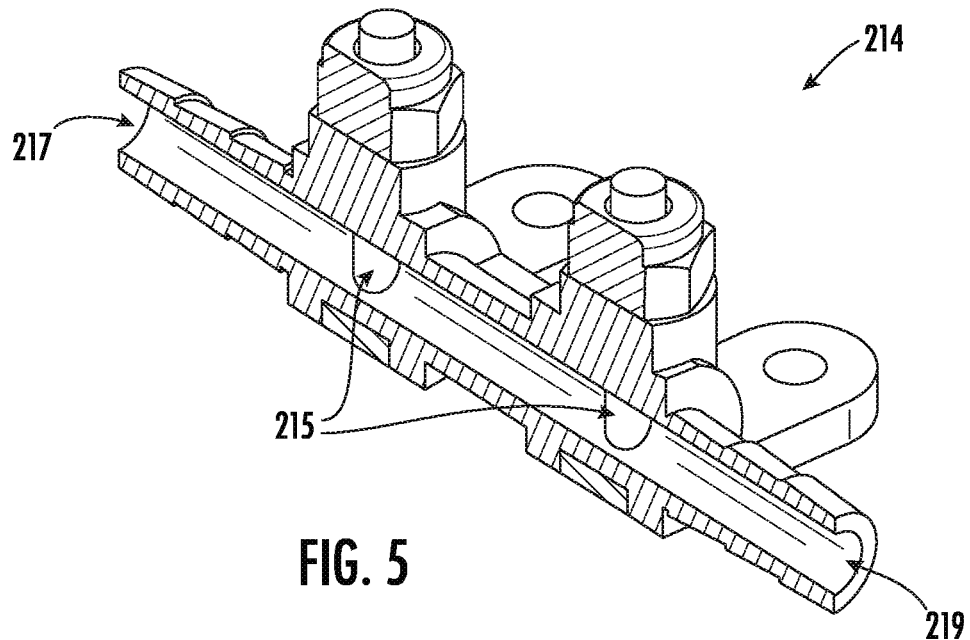
FIG. 5 is a cross-sectional view of the in-line sensor of FIG. 4 according to some embodiments.

As illustrated in FIGS. 4-5 described hereafter, the dispensing system 201 may, in some embodiments, include an in-line sensor 214 positioned in communication with at least one of the fluid supply lines, which may determine the conductivity/resistivity of any fluid passing therethrough in the same manner as the tank sensor described above. For example, in the embodiment shown in FIG. 2, the in-line sensor 214 is coupled to the first additive supply line 207a connecting the detergent supply 206a with the washing chamber 202. In some embodiments, the in-line sensor 214 may be disposed on the output side (e.g., downstream) of the pump 208a to eliminate air infiltration. In some embodiments, the second additive supply line 207b may additionally or alternatively include an in-line sensor 214. As described hereafter, the controller 210 may also be operably coupled to the in-line sensor 214. Similar to the tank sensor 212, the in-line sensor 214 may induce a potential difference between two electrodes so as to identify the conductivity of the fluid between the electrodes. The in-line sensor may be positioned in the fluid supply line 207 connected to the detergent supply 206 so as to identify instances in which detergent is present in the fluid supply line 207. In such embodiments, while the controller 210 may calculate the resistivity and/or conductivity of the fluid passing through the in-line sensor, a pure detergent would generally be expected to have a constant conductivity/resistivity, and in such embodiments, the in-line sensor 214 may be used to detect the presence (e.g., the expected resistivity/conductivity), absence (e.g., infinite resistivity/zero conductivity), and/or type of fluid in the line 207a. Additionally, or alternatively, an in-line sensor may be positioned in the fluid supply line 207 connected to the rinse aid supply 206b so as to identify instances in which rinse aid in present in the fluid supply line 207 (e.g., one, two, or more in-line sensors may be used in the manner described herein depending upon the number of additive supplies). In some embodiments, the detected resistivity/conductivity of the additive passing through the in-line sensor 214 may be used to calibrate the tank sensor 212 (e.g., establishing a base-line for pure, undiluted additive), which the controller 210 may use to determine the concentration of additive in the tank.

With reference to FIG. 3A, a perspective view of a portion of the dynamic dispensing system 201 of FIG. 2 is illustrated. As shown, the dishwasher 200 includes fluid supply lines 207a, 207b connected with pumps 208a, 208b for the respective detergent supply and rinse aid supply. The depicted dishwasher 200 further includes the controller 210 and signal conditioning circuitry 216, the operation of which is described hereafter with reference to FIGS. 6-7 and 10-13. The dispensing system 201 may be configured as described above such that the pumps 208 direct additives to the washing chamber 202. Furthermore, at least one fluid supply line 207a (e.g., associated with the detergent supply 206a shown in FIG. 2) may include an in-line sensor 214 as described hereafter.

With reference to FIGS. 4-5, an example in-line sensor 214 is illustrated. As shown, the in-line sensor 214 may define a first end 217 and a second end 219 opposite the first end 217. As shown in the implementation of FIG. 3A, the in-line sensor 214 may be coupled to one of the fluid supply lines 207a in fluid communication with an additive supply 206 (e.g., detergent supply 206a) and configured to enable the controller 210 to determine the presence of detergent in the respective fluid supply line as described herein. With reference to FIG. 4, the in-line senor 214 may define two electrodes 215 separated by a defined distance. The electrodes 215 may be spaced axially along the fluid supply line. In some embodiments, as shown in FIG. 4, the electrodes 215 may pass through an axial bore of the fluid supply line. In some embodiments, fluid may pass to either side around the electrodes within the axial bore of the fluid supply line. In operation, the fluid (e.g., detergent or rinse aid) enters the in-line sensor 214 via the first end 217, passes the electrodes 215, and exits via the second end 219. The potential difference may be applied between two electrodes 215 so as to identify the conductivity of the fluid between the electrodes via signals sent back to the controller from the signal conditioner. In an example, the in-line sensor 214 may be positioned in the fluid supply line 207a (shown in FIGS. 2-3) connected to the detergent supply 206a (shown in FIGS. 2-3) so as to identify instances in which detergent is present in the fluid supply line 207 by detecting a non-zero conductivity (e.g., a finite resistivity). The current signals passing through the in-line sensor may be directed to the controller 210 via the signal conditioning circuitry 216, whereby the signals are indicative of the conductivity of the fluid in the fluid supply line 207. As discussed below, the signal conditioner 216 directs power to the in-line sensor 214 and converts the current signals from the in-line sensor into a finite-range voltage output corresponding to a signal-input range of the controller 210. While illustrated proximate the pumps 208 in FIG. 3A, the present disclosure contemplates that the in-line sensor 214 may be positioned at any location along one or more of the fluid supply lines 205, 207.

Figure 3C:
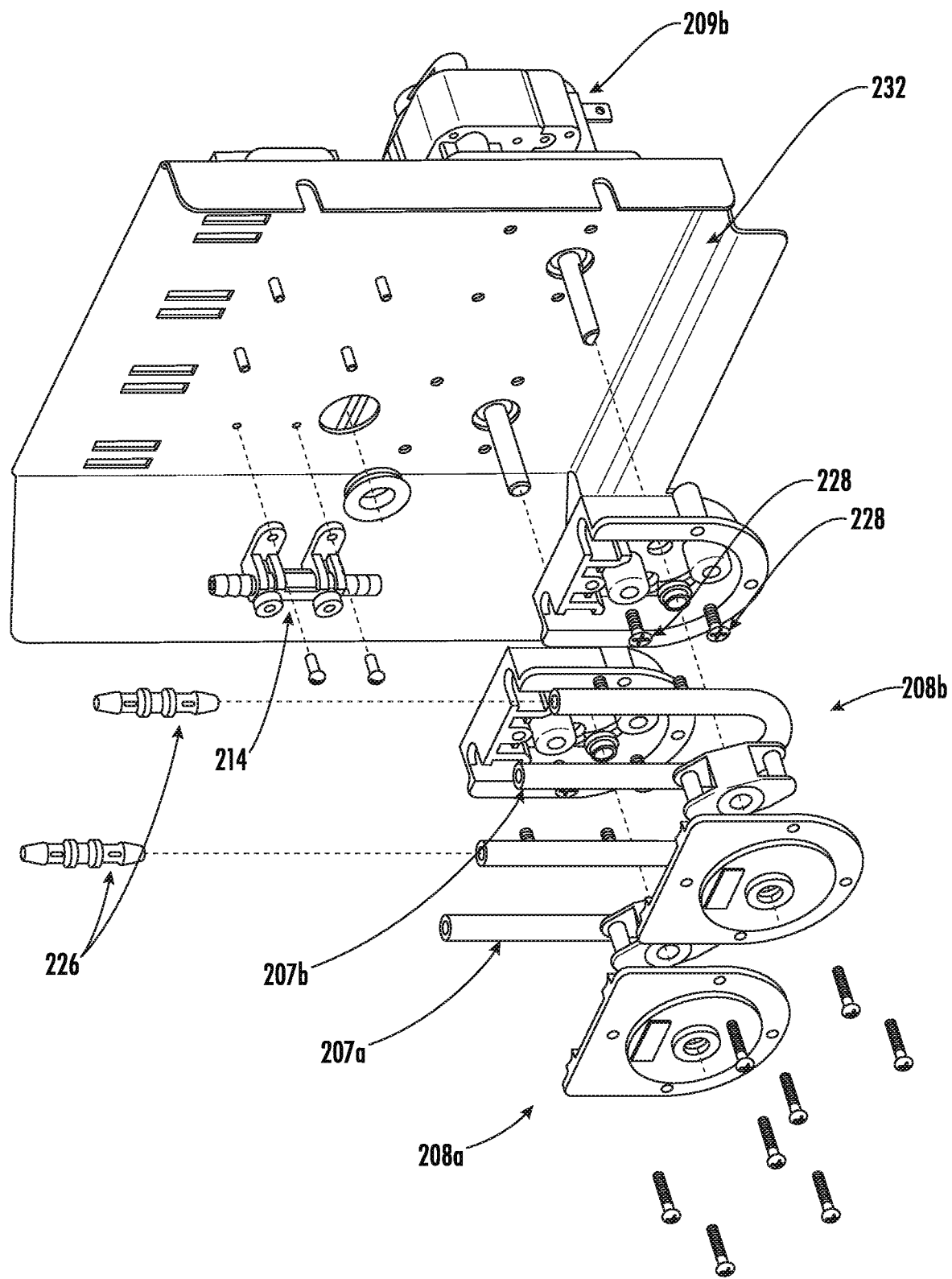

With reference to FIGS. 3A-3E, in some embodiments, one or more components of the dispensing system 201 may be modular to allow for rapid installation, repair, and retrofitting onto pre-existing dishwashers. With reference to FIG. 3B, the modular dispensing system may include a back plate 232 configure to hold one or more components thereon. In the embodiment depicted in FIG. 3B, the back plate 232 supports the pumps 208a, 208b; at least a portion of the additive fluid supply lines 207a, 207b; and the in-line sensor 214. In the depicted embodiment, the components are mounted to the back plate with one or more fasteners (e.g., screws 228). In some embodiments, a bushing 230 may be present to allow one or more wires and fluid conduits to pass through the plate 232. In some embodiments, one or more connectors 226 (e.g., a hose barb) may be coupled with the fluid supply lines 207a, 207b to allow quick coupling of additional conduit during installation of the modular dispensing system. In the embodiment depicted in FIG. 3B, the pumps may rotate clockwise, such that the additive supplies are connected upstream of the pump (e.g., to the connectors 226) and the washing chamber is disposed downstream of the pumps after installation. In some embodiments, the back plate 232 may include one or more mounting member 234 (e.g., comprising a flange and one or more tabs) for engaging a housing of the dishwasher (e.g., as shown in FIG. 3A), which member may allow the back plate 232 to pivot for quick access. FIG. 3C shows an exploded view of the modular dispensing system of FIG. 3B, showing the pump and fluidic components disassembled. As depicted in FIG. 3C, the pumps 208a, 208b may be peristaltic pumps having the additive fluid supply lines 207a, 207b extending therethrough. While described herein with reference to embodiments in which one or more components of the dispensing system 201 may be modular, the present disclosure contemplates that, once retrofitted onto pre-existing dishwashers, the modular components of the detergent system 201 may be formed integrally and/or housed by the dishwasher 200 as a single unit.

Figure 3D:
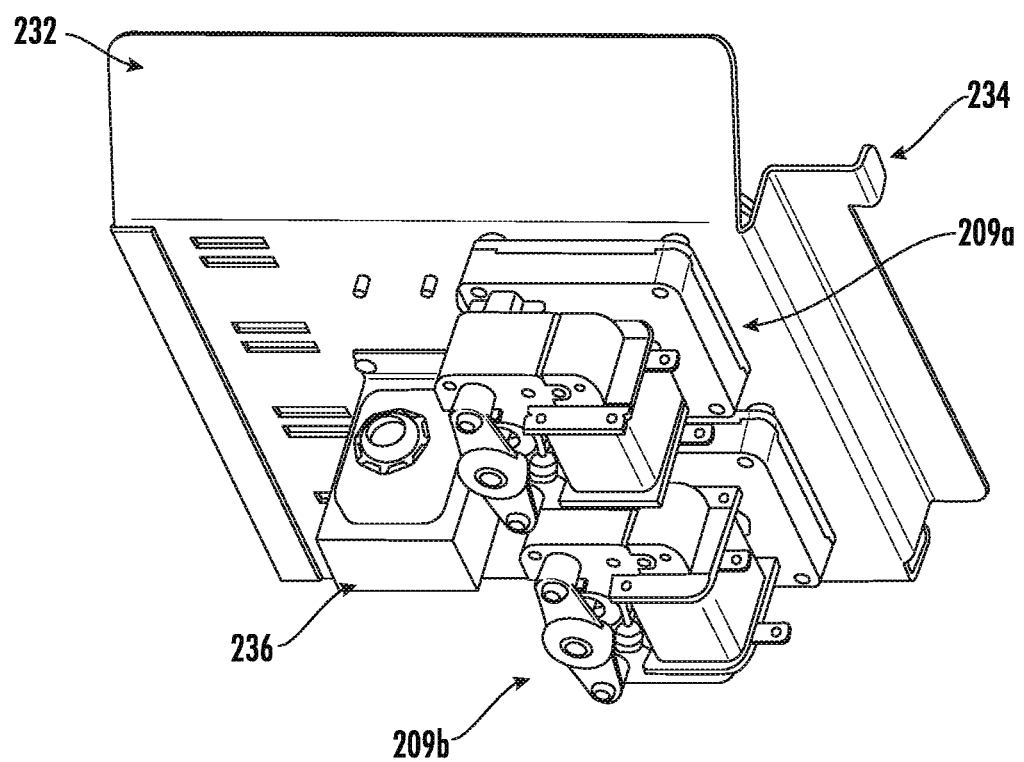
Figure 3E:
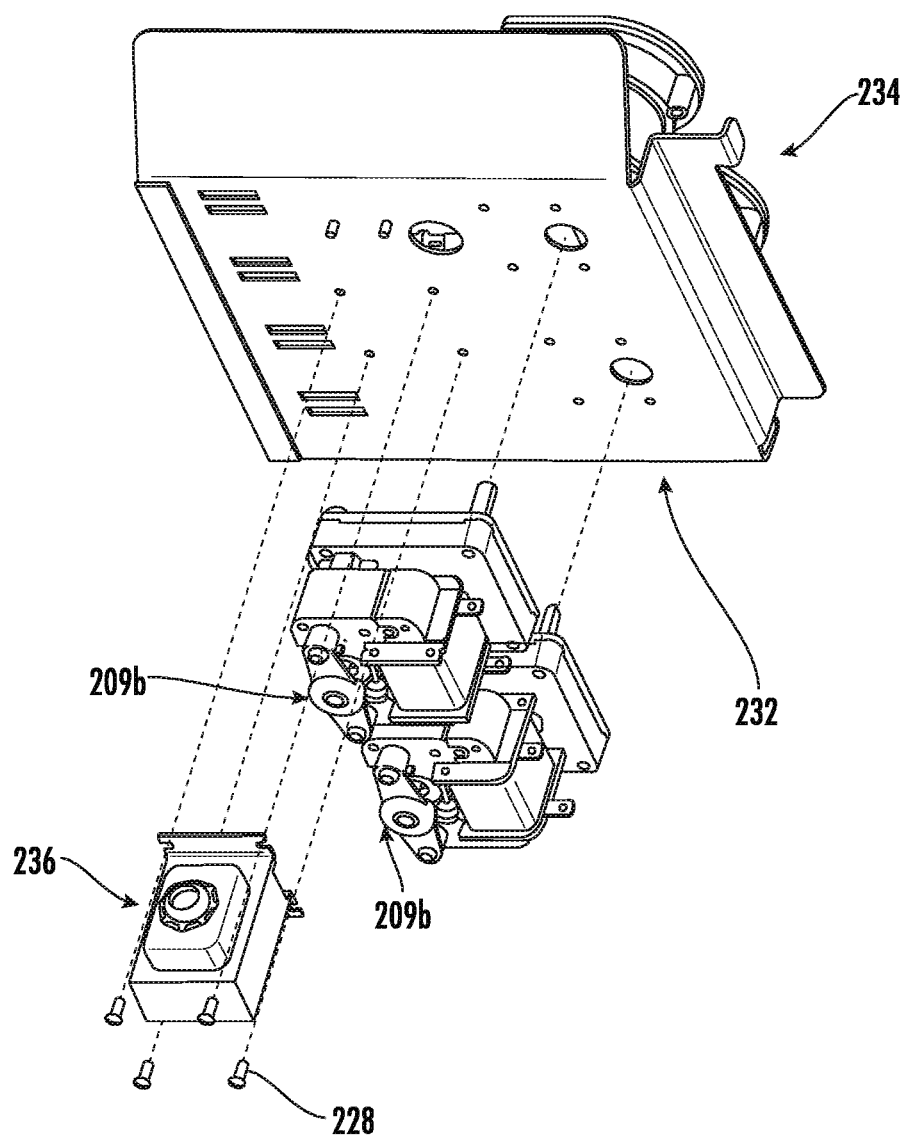

With reference to FIGS. 3D-3E, a reverse side of the modular dispensing system is shown. In the depicted embodiment, each pump 208a, 208b engages a corresponding motor 209a, 209b for driving the pump. The assembly may further include a transformer 236 (e.g., 120/24V, 50/60 Hz, 20VA).

Figure 3F:
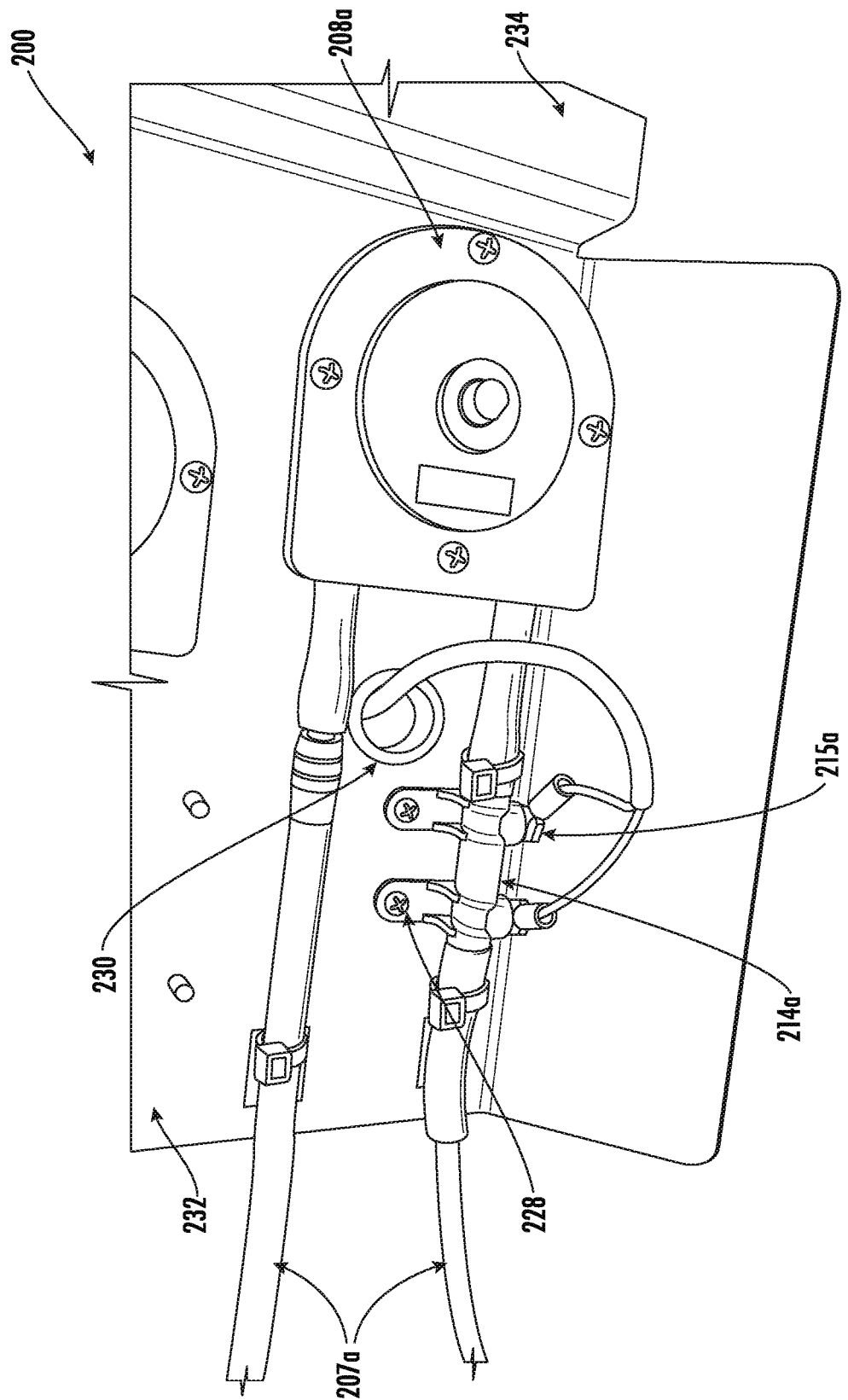
FIG. 3F is a perspective view of a portion of a dynamic dispensing system with alternative sensor arrangement according to some embodiments.

With reference to FIG. 3F, a modular dispensing system as described above with reference to FIGS. 3A-3E is illustrated with an alternative sensor configuration. As shown, the dishwasher 200 includes fluid supply lines 207a connected with pump 208a for the detergent supply. The depicted dishwasher 200 further includes the controller 210 and signal conditioning circuitry 216, and an in-line sensor 214a. The in-line sensor 214a may be coupled to the fluid supply line 207a in fluid communication with an additive supply 206 (e.g., detergent supply 206a) and configured to enable the controller 210 to determine the presence of detergent in the respective fluid supply line as described herein. As described above with reference to FIG. 4, the in-line senor 214a may define two electrodes 215a separated by a defined distance. In the configuration of FIG. 3F, however, the electrodes 215a are positioned vertically within the fluid supply line 207a.

As described herein regarding the potential presence of air bubbles within the fluid supply line 207a, the vertical configuration of the electrodes 215a may operate to reduce the likelihood of contact between the electrodes 215a and an air bubble. As shown, the electrodes 215a are located on a bottom portion of the in-line sensor 214a and fluid supply line 207a. Any potential air bubble in the fluid supply line 207a is likely to be located above the position of the electrodes 215a (e.g., due to a lower density of the air bubble than that of the surrounding fluid). In particular, the electrodes 215a may be formed as pegs that extend partially into the fluid supply line 207a (e.g., without contacting the opposing side of the fluid supply line, such that the ends of the electrode are exposed to the fluid in the fluid supply line) in order to increase the contact area of the electrodes 215a with the fluid within the fluid supply line 207a and avoid contact between the electrodes and air bubbles in the fluid supply line.

Example Methods

Figure 6:
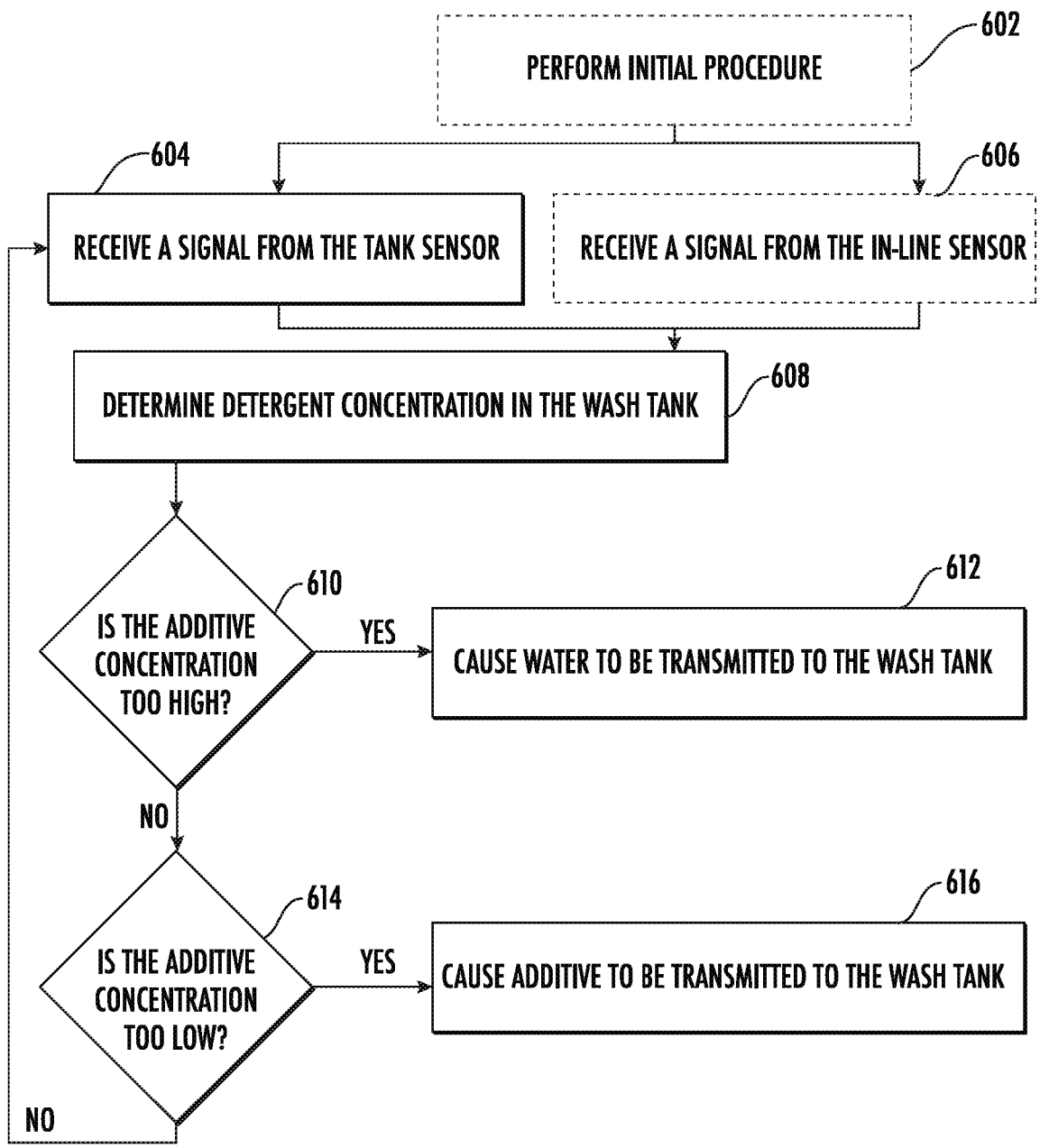
FIG. 6 is a flowchart illustrating a method of detergent concentration adjustment according to some embodiments.

With reference to FIG. 6, a method of operating an example dynamic dispensing system (e.g., method 600) is illustrated. The method 600 may, in some embodiments, include performing an initial procedure at operation 602. The initial procedure 602 may include operations to prime or otherwise prepare the dishwasher 200 electrically and/or fluidically for operation. By way of example, the initial procedure may include performing an initial circulation of fluids within the dishwasher 200, allowing the dishwasher 200 to reach its operating temperature, and the like. In some embodiments, an initial circulation or wash cycle may allow the controller, tank sensor, and/or in-line sensors to receive baseline readings (e.g., prior to the detergent concentration determination operations described hereafter) for the fluid within the system.

The method 600 may further include receiving a signal from the tank sensor at operation 604 and, in some embodiments, receiving a signal from the in-line sensor at operation 606, each in response to a voltage (e.g., an AC voltage) applied across the respective sensor's electrodes. As described above, the tank sensor 604 and/or the in-line sensor(s) 606 may be operably coupled (e.g., in electrical communication) with the controller 210 and/or the signal conditioning circuitry 216. In some embodiments, in response to the voltage applied across the electrodes of the tank sensor and in-line sensor(s), the signal conditioner 216 may receive a current from each of the respective sensors via wires extending therebetween. The signal conditioner 216 may then convert the received current to a voltage (e.g., a voltage between 0-10V), which voltage may be proportional to the conductivity of the fluid (if any) extending between the electrodes. The voltage may then be output from the signal conditioner 216 and input into the controller 210 to signal the conductivity reading to the controller 210.

In some embodiments, the sensors 212, 214 may be operated continuously while the dishwasher 200 is operating. In some embodiments, however, adjustments based upon the readings from the tank sensor 212 may only occur once the internal temperature of the washing chamber reaches above 150 degrees F. and once one wash cycle has been completed. In other embodiments, the sensors 212, 214 may be operated periodically. By way of example, the dishwasher 200 may be concerned with the additive concentration within the washing chamber during a washing operation or during a portion of a washing operation (e.g., while pump 208a is operating). As such, the controller may activate the tank sensor 212 during a wash cycle and receive a responsive voltage reading indicative of the additive concentration in the washing chamber during the wash cycle. In some embodiments, the dishwasher 200 may be concerned with the presence of additive in the fluid supply lines prior to a washing or rinsing cycle. As such, the controller may activate the in-line sensor 214 during a supply operation and receive a responsive voltage indicative of the presence of additive in the fluid supply lines at this time. In some embodiments, the sensor 214 may be operated periodically so as to reduce or prevent the presence of air bubbles or the like from fixing on or more of the electrodes 215 of the sensor 214. Said differently, in instances in which the pump 208a, 208b is not in operation (e.g., lacking fluid flow) one or more air bubbles may contact one or more of the electrodes 215 and produce a faulty reading. In order to reduce the likelihood of such faulty readings, the sensor 214, in some embodiments, may only operate while the respective pump 208a, 208b is operating.

Figure 7:
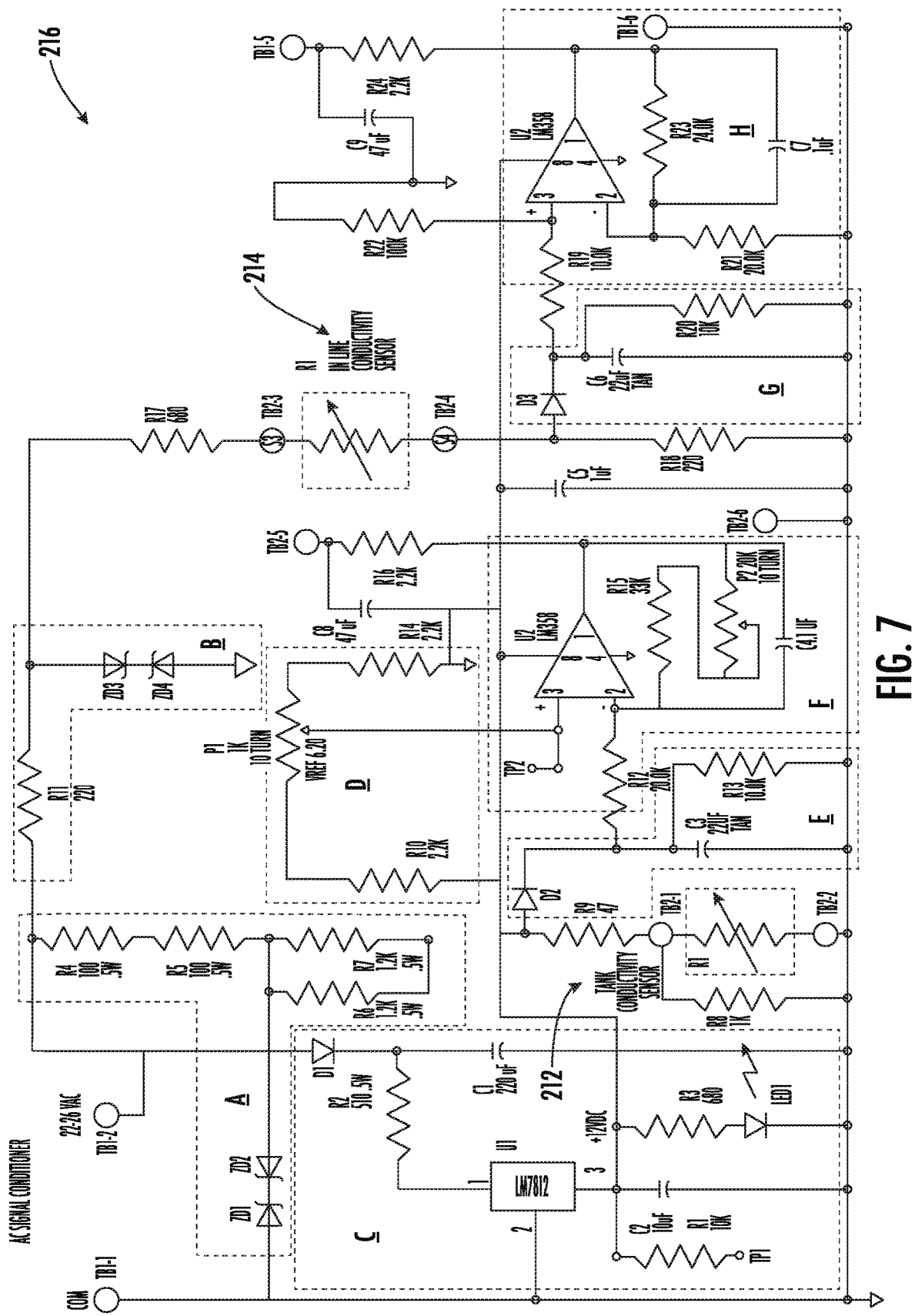
FIG. 7 is a circuit diagram of an example AC signal conditioner according to some embodiments.

As described hereafter with reference to the signal conditioning circuitry of FIG. 7, the current transmitted from either the tank sensor 212 or the in-line sensor(s) 214 to the signal conditioner 216 may be an alternating current (AC). As described above, an AC current waveform (e.g., a modified sine wave) is supplied as an excitation signal to the electrodes (e.g., electrodes 215 in FIGS. 4-5) by the signal conditioner 216 in order to prevent complete ion migration (e.g., plating) to either electrode that could be caused by direct current (DC) excitation signals. In some embodiments, the modified sine wave may be transmitted at a frequency of 50 hz-60 hz and may have an amplitude that is limited to 48 Volts peak to peak (e.g., independent of the applied supply voltage). Although an AC waveform is used to excite the tank sensor 212 and/or the in-line sensor 214, in some instances, the controller may be configured to receive a direct current (DC) voltage input within a predetermined input range (e.g., 0V to 10V). In such an embodiment, the signal conditioning circuitry 216 may be communicably coupled with the tank sensor 212 and/or the in-line sensor 214 so as to receive the AC signals from the respective sensor and convert the current to a DC voltage output. The DC voltage output may subsequently be transmitted to the controller for analysis at operation 608.

The method 600 may further analyze the signal from the tank sensor and/or in-line sensor to determine an additive concentration within the washing chamber and/or the presence of additive in the fluid supply lines at operation 608.

The controller may be configured to receive the scaled voltage (e.g., DC voltage) from the tank sensor 212 via the signal conditioner 216 and associate the voltage with a corresponding concentration (e.g., in parts per million (PPM)) of additive. This association between additive concentration and output voltage may, in some embodiments, be user-inputted via determined concentration correlations. In other embodiments, the controller may actively determine the association between output voltage and concentration via calibration with known samples. By way of example, the controller may cause water from the water supply, via the pump, to fill the washing chamber and may receive a voltage output from the tank sensor indicative of water with no additive therein, which voltage may be stored as a concentration of 0 ppm in the controller memory. In some embodiments, the correlation between voltage (e.g., mV) and detergent concentration (e.g., PPM) may be dependent upon the installation location. By way of example, the mineral content, temperature, etc. of the water for each installation may vary such that the concentration correlations may also vary by location. As such, the calibration procedures described herein, in some embodiments, may be performed at each installation, independent of prior calibration procedures for other installations.

Similarly, the controller may cause pure additive from the additive supply 206 (e.g., detergent from the detergent supply 206a), via the pump 208, to fill the washing chamber and/or in-line sensor and may receive a voltage output form the respective sensor indicative of pure additive, which voltage may be stored as an undiluted concentration in the memory. In some embodiments, one or more known concentration samples may be used to further calibrate the sensors. In some embodiments, the accuracy of the association between output voltage and detergent concentration may be improved by receiving voltage outputs at other known concentrations (e.g., 50%, 25%, etc.). Thereafter, the controller may utilize line fitting techniques, regression techniques, or the like to associate output voltages with additive concentrations. In some embodiments, calibration may be performed during an initial set up of the dishwasher upon initial delivery and/or may be performed periodically during the operating life of the machine (e.g., yearly, monthly, etc.). Similarly, the correlation between voltage (e.g., mV) and detergent concentration (e.g., PPM) may be dependent upon the chemical composition of the selected detergent. As such, the calibration procedures described herein, in some embodiments, may be performed for each selected detergent (e.g., at each installation), independent of prior calibration procedures for other detergents.

The method 600 may similarly receive a voltage from the in-line sensor 214 and determine the presence of detergent or rinse aid in the fluid supply lines. In some embodiments, unlike the tank sensor positioned in the washing chamber in which a fluid solution (e.g., water and detergent) are present, the fluid in the fluid supply line is substantially uniform (e.g., only water, only detergent, only rinse aid, etc.). As such, a voltage output from the in-line sensor 214 that exceeds zero may indicate the presence of detergent in the fluid supply lines.

Various processes may be used to monitor and update the concentration of additive in the tank via the tank sensor 212. In some embodiments, one or more portions of the wash cycle may include a predefined operating range, a predefined maximum, and/or a predefined minimum concentration of additive (e.g., a minimum additive concentration during washing to ensure sterilization). In response to violating one or more concentration rules, the controller may direct the addition of additive and/or water to the washing chamber to rectify the violation. In one embodiment, the method 600 may further include determining if the additive concentration exceeds a maximum concentration threshold at operation 610 and/or if the additive concentration fails to satisfy a minimum concentration threshold at operation 614. In some embodiments, the concentration may be checked relative to a minimum and/or maximum threshold simultaneously. At operations 610, 614, the controller may check one or more concentration thresholds associated with the proper fluid solution concentration within the washing chamber. As would be evident to one of ordinary skill in the art in light of the present disclosure, instances in which the additive concentration is too low may result in dishware that is not properly cleaned or sanitized. Similarly, in instances in which the additive concentration is too high, additive may be wasted and/or dishware may remain at least partially coated with detergent residue. Depending upon the additive used by the system, the controller may define a maximum concentration threshold and a minimum concentration threshold such that the fluid solution within the washing chamber is intended to remain substantially bounded by these thresholds.

In an instance in which the additive concentration exceeds a maximum concentration threshold at operation 610, the controller may cause the water supply 204 to direct water to the washing chamber in order to dilute the additive concentration at operation 612. In some embodiments, the system may proceed normally in response to detecting overconcentration or may not need to detect overconcentration and may monitor a minimum threshold only. As water is directed into the washing chamber, the tank sensor 212 and signal conditioner 216 may continuously or intermittently transmit (e.g., or the controller may iteratively request) voltage outputs indicative of the detergent concentration as describe above. Once the additive concentration has been lowered below the maximum concentration threshold, the controller may cease adding water to the washing chamber 202. Similarly, in an instance in which the additive concentration fails to satisfy a minimum concentration threshold at operation 614, the controller may cause the pump to direct additive from the additive supply 206 to the washing chamber at operation 616 in order to increase the additive concentration in the washing chamber. As additive is directed into the washing chamber, the tank sensor 212 and signal conditioner 216 may continuously or intermittently transmit voltage outputs indicative of the additive concentration as describe above. Once the additive concentration exceeds the minimum concentration threshold, the PLC may cause the pump to halt direction of additive into the washing chamber. In some embodiments, an alarm may be programmed to trigger if the concentration deviates from an acceptable range or, for example with the in-line sensor 214, if additive is not detected. The alarm may stop operation of the dishwasher 200 and/or alert the user to an error (e.g., a clog in the line, failure of the pump, empty additive supply, etc.).

As described above, in some embodiments, the controller may be configured to receive a signal from the tank sensor; analyze the signal from the tank sensor to determine an additive concentration within the washing chamber; and, in an instance in which the additive concentration fails to satisfy a minimum concentration threshold, cause additive to be added to the washing chamber (e.g., without monitoring a maximum additive concentration threshold). By way of example, some dishwasher implementations utilize several and/or iterative rinse cycles (e.g., with water and/or rinse aid) such that the additive concentration, for example detergent, is similarly diminished over time. As such, in some embodiments, the controller may only be configured for determining an additive concentration within the washing chamber as related to the minimum concentration threshold.

Figure 11:
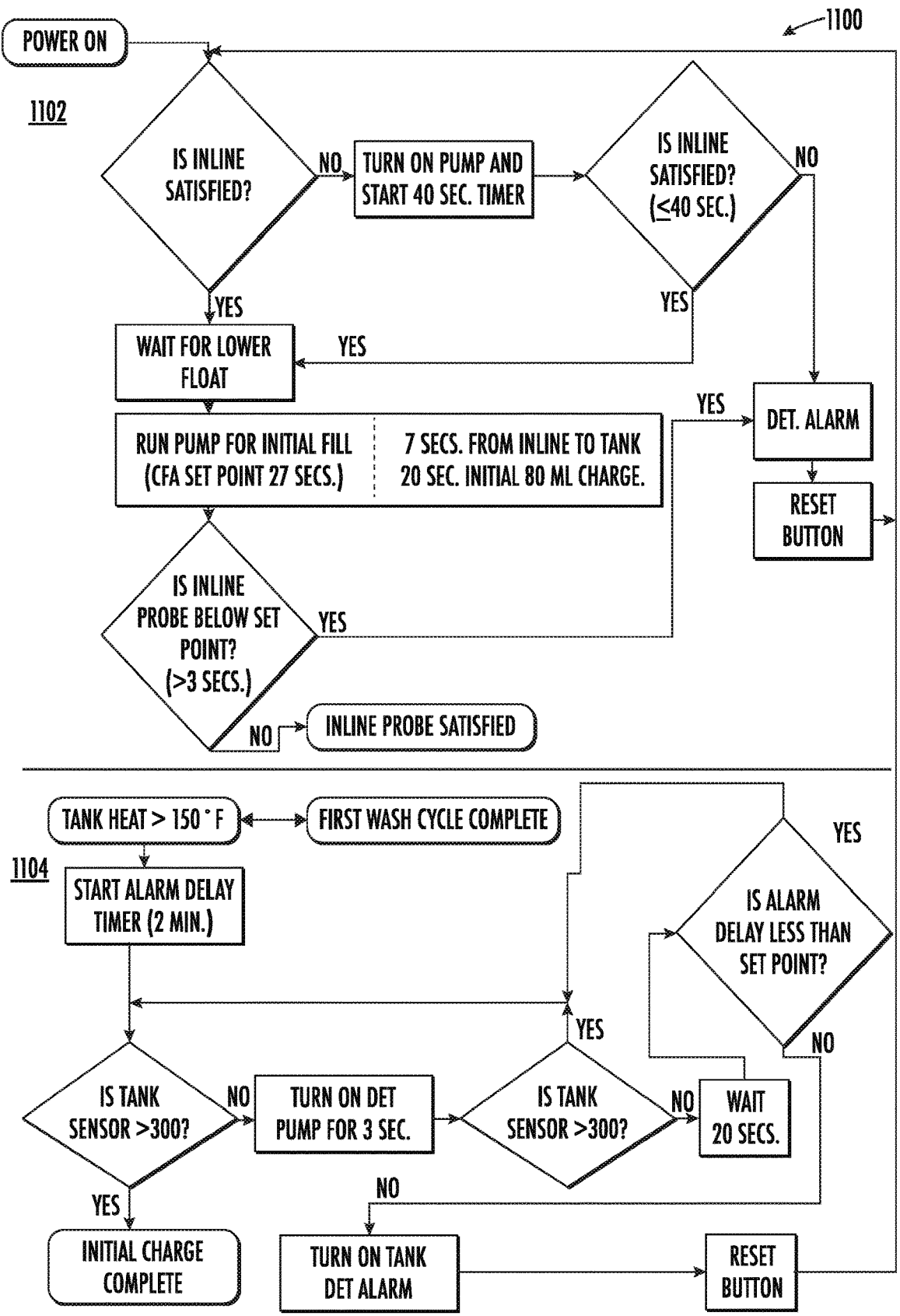
FIG. 11 is a flowchart illustrating a method of operating the additive dispensing system according to some embodiments.

With reference to FIG. 11, an example flow diagram of a method of using a dynamic dispensing system is shown. In the depicted embodiment, the process 1100 includes an initial fill subroutine 1102 and a normal operation subroutine 1104. The depicted embodiment describes detergent filling with a detergent pump and may be applicable to other additives as discussed herein. In the depicted example, the initial fill subroutine 1102 comprises powering the device on and checking if the in-line sensor (e.g., an in-line sensor 214 as discussed herein) is satisfied by detecting the presence of the additive in the fluid line. If satisfied, the system waits for a signal from a lower float in the tank to confirm a predetermined amount of water has been added, after which the pump (e.g., one of the additive pumps 208a, 208b) is run for an initial fill period (e.g., 27 seconds). After the initial period, the subroutine confirms whether the in-line sensor (e.g., sensor 214) is below its set point, which would indicate a loss or lack of additive supply. If no, the initial fill subroutine is complete. If the in-line sensor is below the set point, an alarm is transmitted to the user, who can then repair the machine or replace the additive and reset the process. After initial power up, if the in-line sensor (e.g., sensor 214) is not satisfied the subroutine may run the pump 208a, 208b for a maximum period (e.g., 40 seconds), while continuously or intermittently checking for the presence of the additive. If the additive is not detected after the maximum period, an alarm may be transmitted to the user, who can then repair the machine or replace the additive and reset the process. In some embodiments, a manual "prime" option may be used in addition to or instead of an automated system. For example, rinse aid may be dispensed without an in-line sensor, and the UI of the dishwasher may present an option to prime the rinse aid lines. A user may visually inspect the lines for confirmation that additive is flowing.

After the satisfaction of the initial fill subroutine 1102, the dishwasher may proceed to normal operation 1104. In some embodiments, as shown in FIG. 11, the system will not analyze tank concentration until the temperature of the water (e.g., as detected via a temperature sensor) is above 150 degrees F. and one wash cycle has been completed. During operation, in some example embodiments, a thermometer or equivalent temperature sensor may confirm that the tank of the washing chamber is above a predetermined temperature (e.g., 150 degrees F.), after detecting the predetermined temperature and after one wash cycle, an alarm delay timer may be started (e.g., for 2 min), during which the controller will check if the tank sensor (e.g., sensor 212) reads above a predetermined set point (e.g., 300 mV). If the tank sensor reads above 300 mV, the initial charge will be considered complete. If the tank sensor reading is at or below 300 mV, the additive pump (e.g., detergent pump 208a) will be run for a predetermined time (e.g., 3 seconds) and the concentration in the tank will be checked again. If, during the second check, the tank sensor reading is above 300 mV, then the process returns to the first point and the initial charge is complete. If, during the second check, the tank sensor reading is still below 300 mV, the process waits 20 seconds, verifies that the alarm delay is less than a set point, and restarts the process from the first check (e.g., adding more additive as needed). If the alarm is triggered, the detergent alarm is transmitted to the user, who may then repair the system and/or add additive and reset the process.

In some embodiments, the tank is preset to 3.00 v (approximately 100 ppm) and the in-line sensor is preset to 7.00 v (substantially pure additive). In some embodiment, the rinse aid may be set to run for a predetermined time at the end of each wash cycle (e.g., 5 seconds @ 10 ml/min). In some embodiments, voltage may be used with an in-line sensor to identify the chemical being delivered. For example, a reading of greater than or equal to 7.00 v may be calculated as detergent, a reading of less than 7.00 v and greater than or equal to 4.00 v may be calculated as rinse aid, and a reading of less than 4.00 v may be calculated as water. In some embodiments, one or more thresholds may be used to differentiate between two or more different chemicals (e.g., in the preceding sentence, two thresholds, 7.00 v and 4.00 v, are used to differentiate between three chemicals—water, rinse aid, and detergent). The controller may then program the pump operation based on the identification (e.g., by determining which chemical is in a particular fill line, the controller may determine which pump to operate at which time in the wash cycle). In some embodiments, the in-line sensor may also associate an infinite resistivity (e.g., 0 v output) with the presence of air in the line to signal an error, empty detergent container, or other fault. As described above, different detergents may require different calibration procedures due to the chemical compositions of the detergent. For example, a sodium hydroxide based detergent may reflect the 300 mV determination described above. For a potassium carbonate based detergent, however, the tank sensor reading may instead be compared against a 458 mV threshold.

In some embodiments, each of the set points and variables described herein may be adjustable (e.g., customized) via a user interface of the dishwasher or controller, which allows for complete control of the washing process. In some embodiments, a technician may calibrate and program the device during initial setup. The user interface may allow, for example, configuration of fill, cycle, and prime pump cycle times for the detergent, and at least cycle time for rinse aid. The fill time may include the number of seconds that the additive (e.g., detergent) pump runs after the in-line probe is satisfied. The cycle time may be the number of seconds the detergent pump runs at the beginning of each wash cycle, based on the desired volume (e.g., 1 second may equal approximately 3.2 ml of detergent depending on the pump used). A prime time may represent the number of seconds that the additive (e.g., detergent) pump runs on a new installation or when the machine depletes the additive supply, which priming will allow the in-line sensor (if used) to be satisfied. The user interface may further allow configuration of in-line and tank alarm thresholds and display actual, real-time sensor voltages. In some embodiments, the user interface may be transmitted to a display or remote device from the controller via one or more communications interfaces (e.g., wired VGA cable, Ethernet cable, wireless adapter, or the like).

Signal Conditioning and Voltage Determination

As described above, in order to prevent plating to the electrodes of the tank sensor and/or in-line sensor, an AC excitation signal may, in some embodiments, be applied to the sensor electrodes such that the output is an AC waveform. In order to rectify the AC output to a DC voltage for use with the controller 210, signal conditioning circuitry 216 (e.g., circuitry 216) may be used by the dishwasher 200. The signal conditioner 216 may be designed to take the output from one or more, nonamplified contact conductivity probes (e.g., sensors 212, 214) and convert it into an analog 0-10 VDC format that is readable by the controller (e.g., a Programmable Logic Control) utilizing an Analog to Digital converter input module. The output of this module may be directly proportional to the conductivity of the aqueous ionic solution under test. Input to the module may be from the respective sensor electrodes with a conductivity range of 0 (zero) to infinity and an output to the controller of 0 VDC to 10.00 VDC. TABLE 1 is provided below showing an example embodiment of the reciprocal relationship between the ionic conduction of a solution (e.g., the solution in the tank of the washing chamber) to the solution's resistance.

TABLE 1

| Resistivity (Ohm/cm) | Conductivity (Micromho/cm) | PPM |
|---|---|---|
| 2,000,000 | 0.5 | .25 |
| 1,000,000 | 1 | .50 |
| 500,000 | 2 | 1.0 |
| 200,000 | 5 | 2.5 |
| 50,000 | 20 | 10 |
| 20,000 | 50 | 24 |
| 10,000 | 100 | 48 |
| 5,000 | 200 | 95 |

Figure 8:
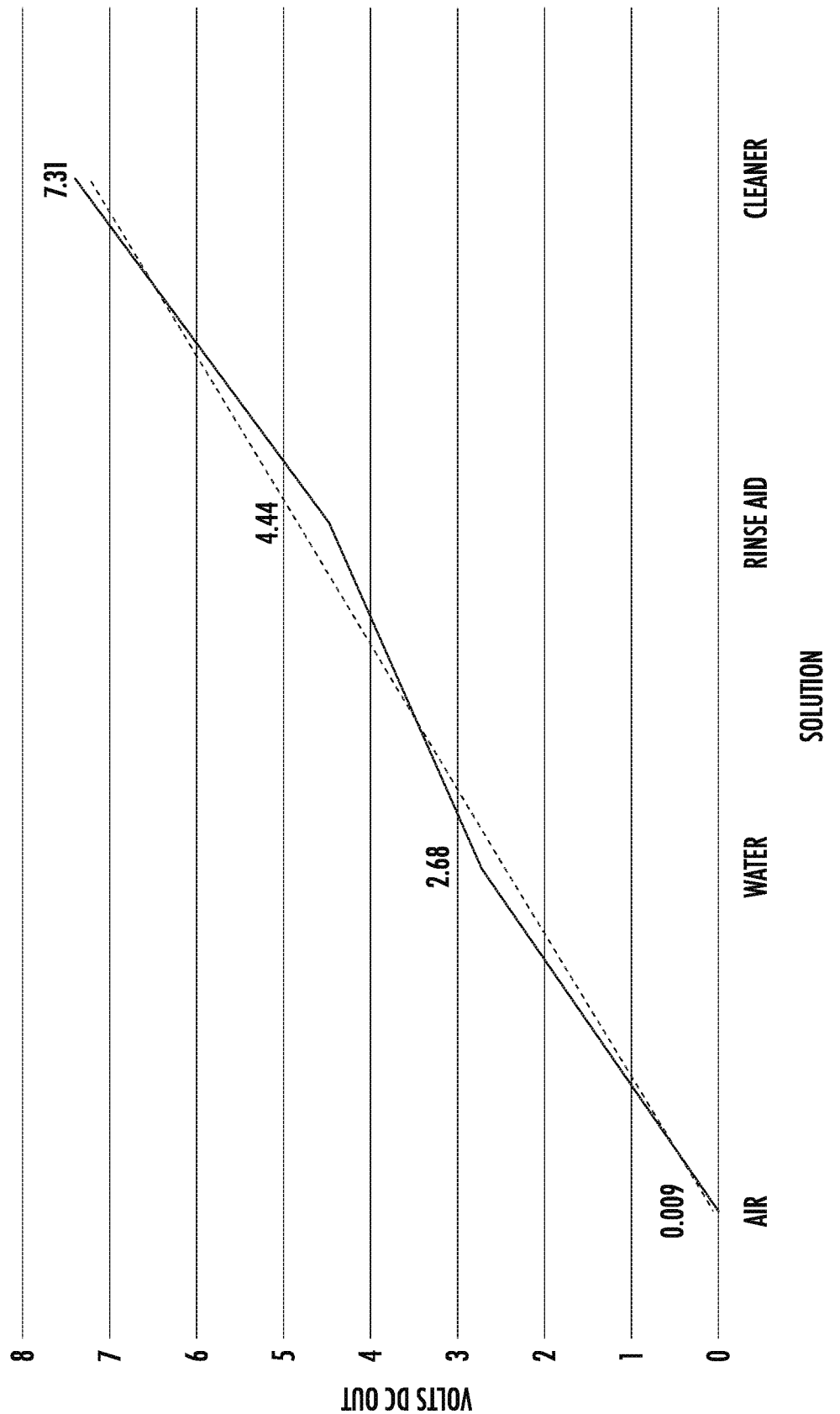
FIG. 8 is a plot of VDC versus solution type according to some embodiments.
Figure 9:
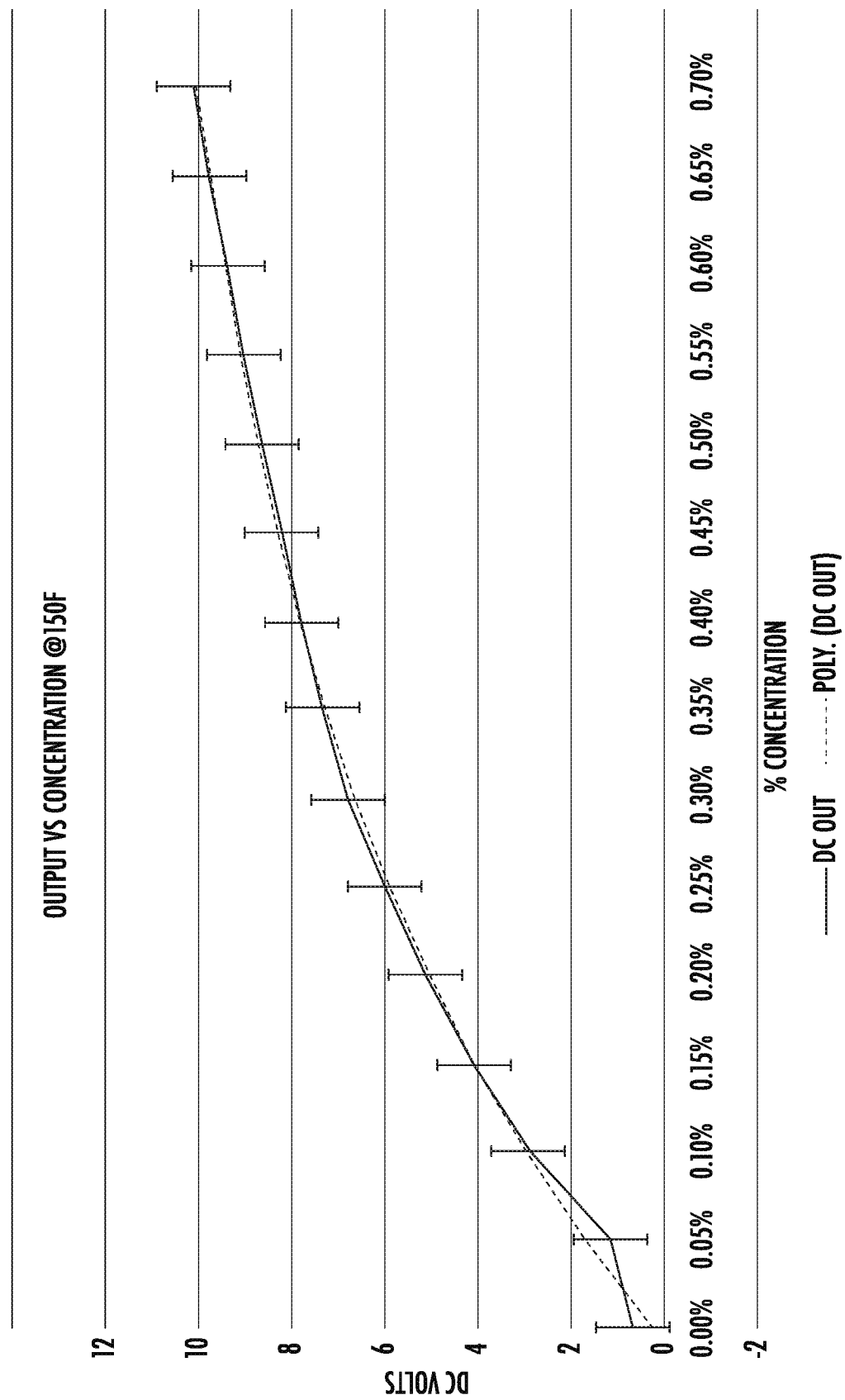
FIG. 9 is a plot of VDC versus concentration of detergent according to some embodiments.

By knowing the conductivity of a given solution for the process, a method of determining if the correct solution of the correct concentration may be used during each phase of the wash process. For example, TABLE 2 below shows the resulting output voltage (e.g., on the 0-10 VDC scale generated by the signal conditioner) to the controller of various example fluids that may be detected by the sensors 212, 214. FIG. 8 depicts a plot of solution type versus output voltage according to an example. Each of the solutions illustrated in FIG. 8 are examples of a pure form but, in practice, may have varying concentrations between suppliers. Moreover, FIG. 9 further includes a plot of detergent concentration versus voltage according to an example embodiment.

TABLE 2

| Solution | Output Voltage |
|---|---|
| Air | Null VDC |
| Ultra-Pure Water | 0.043 VDC |
| Tap Water (typical) | 0.625 VDC |
| Rinse Aid | 1.65 VDC |
| Salt Water | 6.65 VDC |
| Hydroxide based Soap | 7.92 VDC |

With reference to FIG. 7, example signal conditioning circuitry 216 is illustrated. As shown, the circuitry 216 may include various circuitry modules (e.g., modules A-H). Module C may represent a power source for one or more elements of the controller 210, the tank sensor 212, or the in-line sensor 214. In some embodiments, module C may comprise a 12 volt or 24 volt DC power supply. While illustrated and described herein with a power supply (e.g., module C) of the signal condition circuitry the present disclosure contemplates that a DC power source may be provided by any power source of the dishwasher 200. In the depicted embodiment, module C includes voltage regulation, filtering, and LED indication.

The circuitry 216 may further include a module A (e.g., sine wave modification circuitry) configured to receive an AC voltage from an external 24 VAC source and generate a modified AC sine wave output to serve as the excitation signal for the electrodes of the sensors (e.g., for the tank sensor 212). This sine wave output may have a peak to peak voltage of 48 volts and a current limited to 30 milliamps average, and 70 milliamps max. Module A may utilize one or more diodes configured to clamp the sine wave output to this peak to peak voltage. The circuitry 216 may further include a module B configured to operate substantially identical to module A in generating an AC sine wave output for application to the in-line sensor 214. Module B may similarly include one or more diodes configured to clamp the sine wave to a peak to peak voltage of 48 volts. In embodiments utilizing additional sensors, additional sine wave modification circuitries may be provided, and in embodiments utilizing fewer sensors, fewer sine wave modification circuitries may be used.

The signal conditioner 216 may also include a module D (e.g., offset voltage circuitry) configured to allow discrimination of at least the tank probe 212 output until a set concentration level is detected. Said differently, the range of detected detergent concentration within the washing chamber may only encompass a portion of the voltage output of the tank probe 212. As such, module D may utilize a variable resistor to set a discrimination point (e.g., 6.2 volts) below which the tank sensor AC voltage output is approximately zero volts. Once the discrimination point is exceeded, the output is directed to module E described hereafter for amplification. In this way, module D allows for greater resolution in the area of detergent concentration interest, while excluding noise.

The circuitry 216 may also include a module E (e.g., peak detection and hold circuitry) that is configured to detect the peak current flowing through the tank sensor 212 and rectify it to DC before inputting this signal into module F. As described above with reference to modules A and B, an AC sine wave may be applied to the tank sensor 212 and/or in-line sensor 214. As such, the output signal waveform from the tank sensor 212 may include a positive peak and negative peak. Module E may detect these peaks in the current flow and rectify the AC signal to a DC signal (e.g., set the peak values as the DC value). Module G may operate substantially the same as module E for the in-line sensor 214, in embodiments using two sensors, and additional modules may be added for additional sensors.

The circuitry 216 may further include a module F (e.g., amplifier circuitry) configured to amplify the signal received from module E and scale the tank sensor 212 signal appropriately for transmission to the controller 210. In some embodiments, the controller 210 may operate to receive DC voltage inputs that range from 0 to 10 volts DC. As such, module F may utilize a variable resistor to set the gain (e.g., slope) for conversion between detergent concentration (e.g. PPM) and DC voltage. With regard to the in-line sensor 214, module H also defines an amplifier for amplifying the signal received from module G. With module G, the amplifier may be of a linear output with a fixed gain to match the K factor (e.g., cell constant) of the in-line sensor 214. In this way, the entire bandwidth of the concentrations of concern are covered. Unlike the tank sensor 212, the in-line sensor 214 is configured to detect the presence of detergent within the fluid supply lines as opposed to a concentration in a fluid solution. Therefore, the concentrations of concern may be bounded by the sensitivity of the in-line sensor 214 as opposed to a particular region of detergent concentrations.

Figure 10:
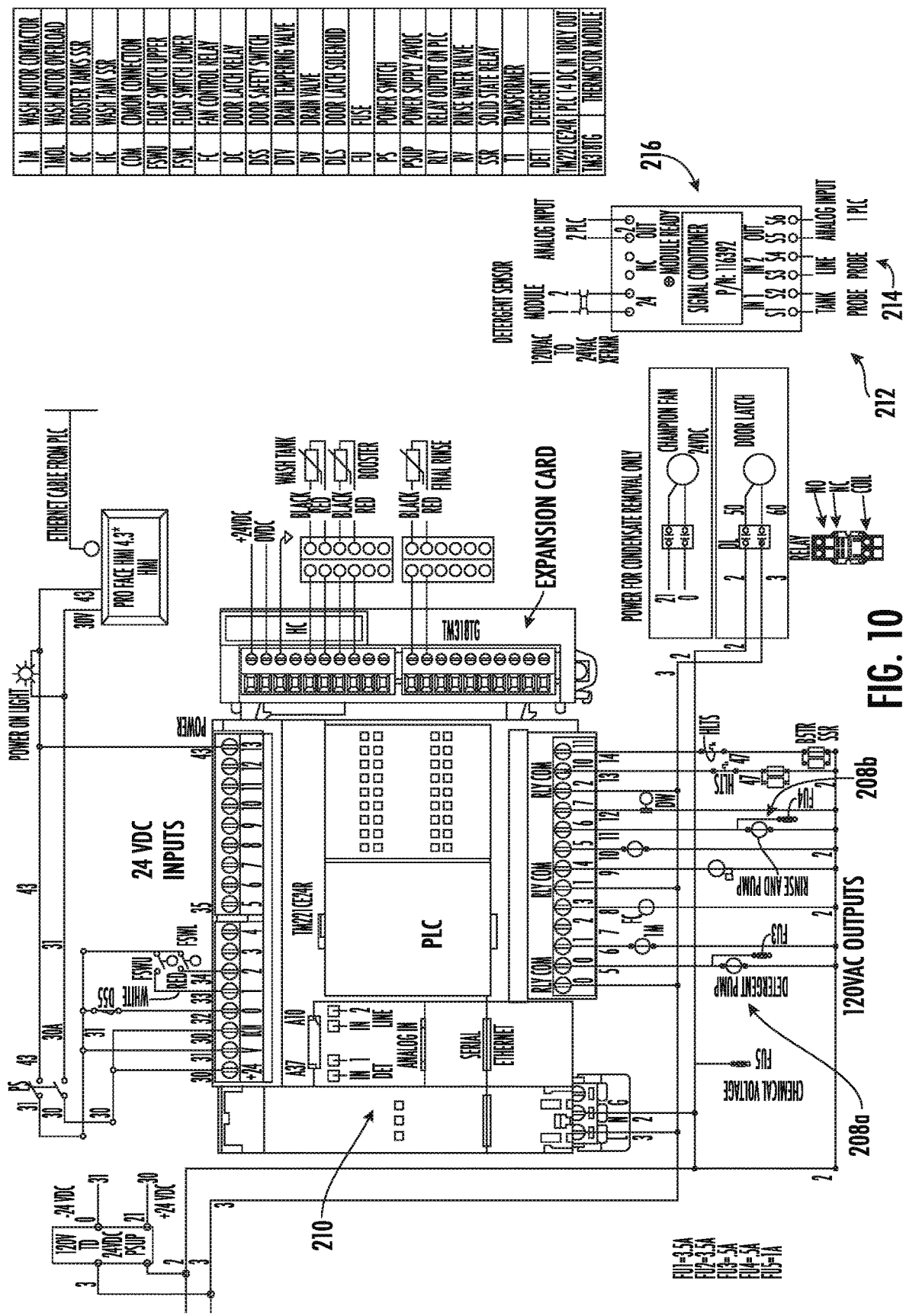
FIG. 10 is a diagram of a controller and signal conditioner according to some embodiments.

With reference to FIG. 10, an example electrical schematic of a controller 210 and signal conditioner according to some embodiments is depicted. In the depicted schematic, the controller 210 includes 120 VAC outputs to power components of the dishwasher 200 (e.g., pumps 208a, 208b) and receives signals from the signal conditioner indicative of the probe readings (e.g., from sensors 212, 214).

A method of operating the signal processing circuitry 216 according to an example embodiment will now be described with reference to the labeling in the diagram of FIG. 7. In an example embodiment, input power of 24 volts AC typical may be applied to input terminals 1 and 2 respectively. Diode D1 may provide for rectification. R1 and C1 may provide input noise filtering as well as current limit protection. Voltage regulator VRL and C2 may generate a reference voltage of 12 VDC to be applied to the test bridge circuit. R2 and LED 1 may provide for a visual indicator that the module is input properly installed and functional. In the depicted embodiment, the conductivity sensor (Rt) is connected to terminals S1 and S2. R3, R4 and, Rt form the test voltage divider circuit. D2 and C3 form the peak hold circuit. The voltage developed across R4, C3 may then be applied to input of amplifier F to be conditioned for output on terminals TB2-5 and TB2-4 as output to the controller 210. In some embodiments, the wires to the Rt (sensor) and controller output wires are twisted pairs of no less than 3 twist per inch to shield against unwanted noise being induced to the module output.

Figure 12:
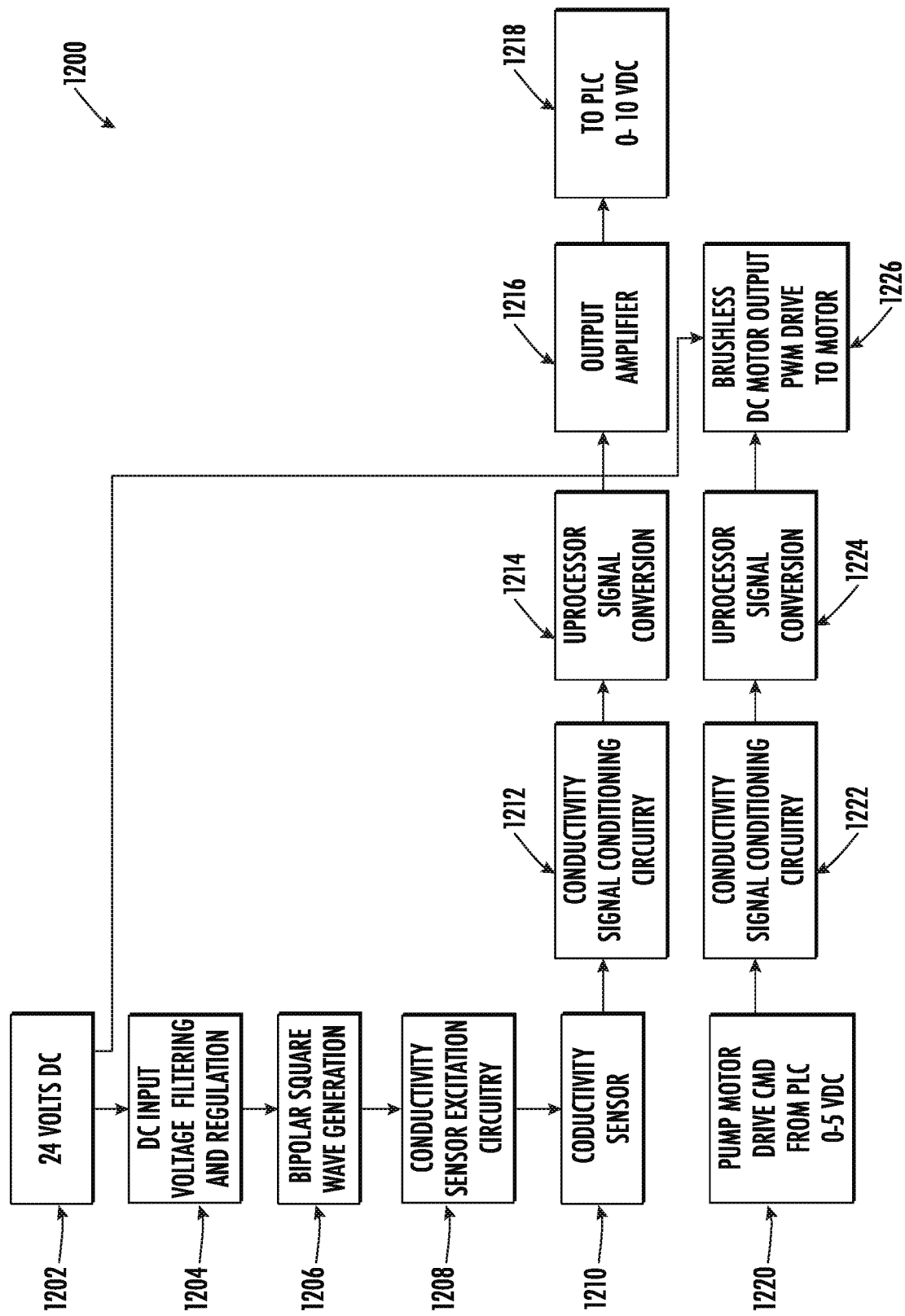
FIG. 12 is a block diagram of a controller and signal conditioner according to some embodiments.
Figure 13:
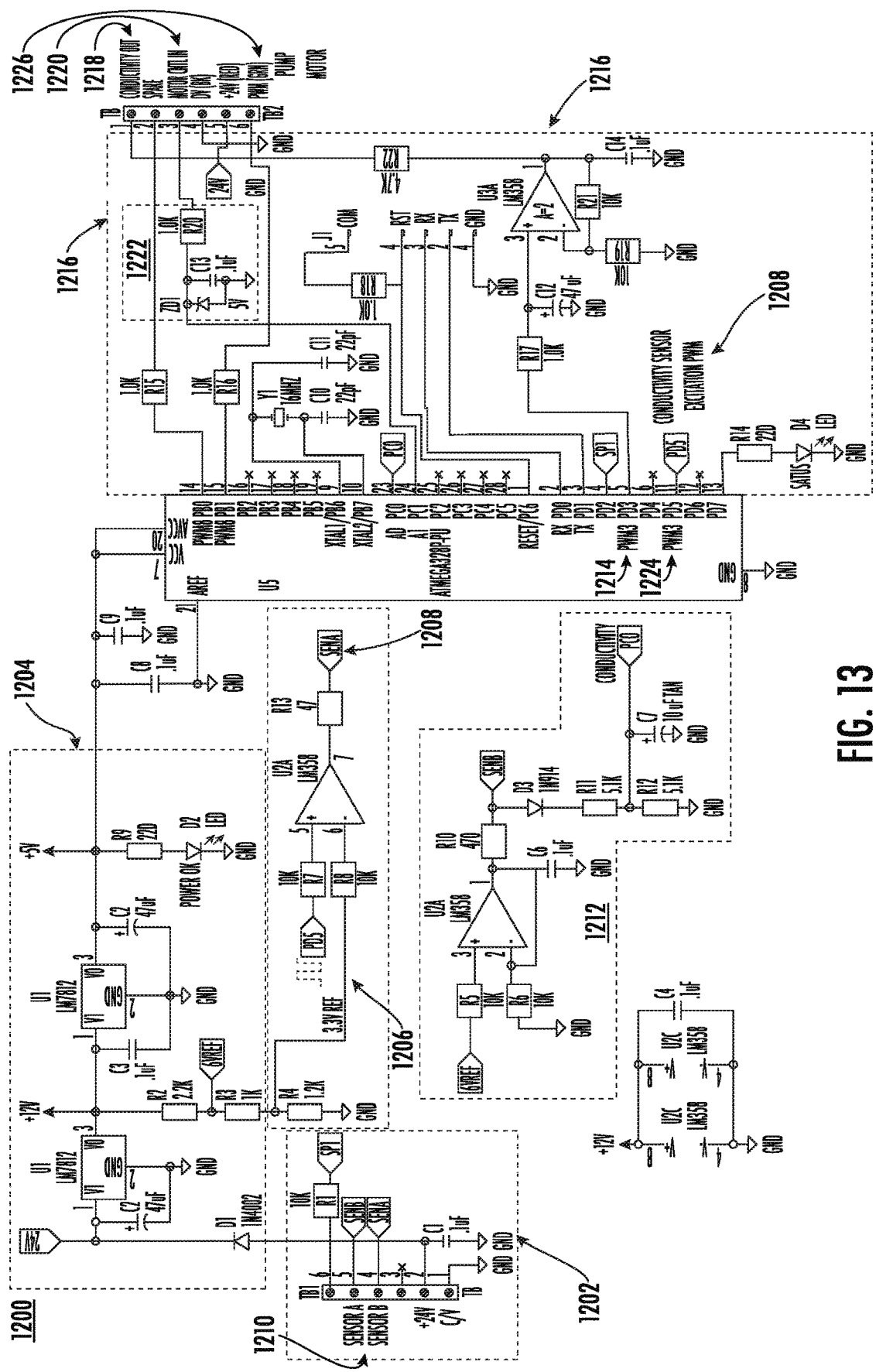
FIG. 13 is an example circuitry diagram of the controller and signal conditioner of FIG. 12.

As described above, in some embodiments such as illustrated in FIGS. 7 and 10, the circuitry 216 may be configured for use with AC power from a building power supply. With reference to FIGS. 12-13, however, a block diagram and circuitry diagram, respectively, of an example controller and signal conditioning circuitry 1200 for use with a direct current (DC) input are shown. Unlike the circuitry 216 described above that may utilize an Analog to Digital converter input module, the circuitry 1200 may operate in conjunction with a reduced instruction set computer (RISC) microprocessor such that the circuitry 1200 includes only digital components (e.g., the microprocessor is used for signal conditioning and conversion). As shown in FIGS. 12-13, the circuitry 1200 may include a DC voltage input 1202 from, for example, a 24 VDC source. Although illustrated and described herein with reference to a 24 volt DC power supply or source, the present disclosure contemplates that the circuitry 216 may be configured to receive a DC input of any magnitude. The circuitry 1200 may further adjust frequency variations of the voltage input to ensure a constant (e.g., unvarying) DC voltage. In some embodiments, the DC circuit may be configured to receive power directly from the primary power supply of the appliance, which power supply may be connected to the building mains. The circuitry 1200 illustrated in FIGS. 12-13 may also operate as a higher frequency excitation sensor (e.g., approximately 300 Hz) compared to the circuitry illustrated in FIGS. 7 and 10 (e.g., configured for use with AC power).

The circuitry 1200 may further include bipolar square wave or sine wave generation circuitry 1206 and conductivity sensor excitation circuitry 1208. The circuitry 1206 may be configured to generate a bipolar square wave output to serve as the excitation signal for the electrodes of the sensors (e.g., for the tank sensor 212) at circuitry 1208. Similar to a modified sine wave as described above with reference to FIG. 7, the bipolar square wave may change polarity with time in order to prevent complete ion migration. This bipolar square wave output may have a peak to peak voltage of 5 volts or the magnitude of the square wave may alternate between +5 volts and −5 volts (e.g., 5 volts in the opposing direction). As shown, the bipolar square wave circuitry 1206 may be configured for use with a single tank sensor 212; however, in embodiments utilizing additional sensors, additional bipolar square wave or sine wave modification circuitries may be provided.

The bipolar square wave generated by the circuitry 1206 may be supplied to the conductivity sensor at 1210 by conductivity sensor excitation circuitry 1208. As described above, a tank sensor 212 positioned within the washing chamber 202 may be electrically coupled with the circuitry 1200. The tank sensor 212 may comprise a conductivity/resistivity sensor configured to determine a resistivity (and by a reciprocal relationship, the conductivity) of the fluid solution within the washing chamber 202. In some embodiments, the tank sensor 212 may define electrodes separated by a predetermined distance. The tank sensor 212 may conduct an electric current between the electrodes via the fluid solution in the washing chamber to determine the resistivity of the fluid and characterize the type and/or concentration of additives dissolved in water. In operation, a potential may be applied across the electrodes via the conductivity sensor excitation circuitry 1208 and the current passing between the electrodes may be measured. The use of a bipolar square wave or sine wave may operate to prevent complete ion migration (e.g., plating) of one of the electrodes in the tank sensor 212.

With continued reference to FIGS. 12-13, the circuitry 1200 may further include conductivity signal conditioning circuitry 1212, processor signal conversion circuitry 1214, and output amplifier circuitry 1218 configured to receive the output from the conductivity sensor at 1210 and adjust, modify, or otherwise prepare the output for use by the PLC at 1218. For example, the signal conditioning circuitry 1212 may include components for amplification, filtering, range matching, isolation, or any related operation to provide the output of the conductivity sensor 1210 (e.g., tank sensor 212) in suitable form for use by the remaining components of the circuitry 1200. The uProcessor signal conversion circuitry 1214 may operate as analog-to-digital conversions, gain, slope, and offset functions, or other encoding in which the representation of analog information is converted to a digital signal. Said differently, the uProcessor signal conversion circuitry 1214 may receive the sequence of voltage outputs of the conductivity sensor 1210 via 1212 and translate these voltages outputs into an analog signal. The PLC at 1218 may be configured with DC voltage inputs that range from 0 to 10 volts DC. As such, the output amplifier circuitry 1216 is configured to output a DC signal from 0 to 10 VDC proportional to the signal input 1210.

In any of the embodiments described herein, control of the pumps (e.g., pumps 208) may also be integrated into the same controller and signal conditioning circuitry. With reference to FIGS. 12-13, for example, the pump motor drive may be integrated into or otherwise communicably coupled to the PLC, controller, or the like such that the pump motor drive may receive a command from the PLC at 1220. In particular, the circuitry 1200 may determine a concentration of the fluid within the washing chamber via 1202-1218 and may, for example, determine that the additive concentration is too low (e.g., as described in FIG. 6). This determination at 1218 by the PLC may result in a responsive command to the pump motor at 1220 to, for example, disperse more additive to the washing chamber. Similar to the conditioning circuitry 1212 and the signal conversion circuitry 1214 described above, the command from the PLC may be conditioned by motor command signal conditioning circuitry 1222 and converted by the uProcessor signal conversion circuitry 1224. The signal conditioning circuitry 1222 may include components for amplification, filtering, range matching, isolation, or any related operation to provide the command of the PLC in suitable form for use by the remaining components of the circuitry 1200. The uProcessor signal conversion circuitry 1224 may operate as analog-to-digital conversions or other encoding in which the representation of digital information is converted to a digital signal. Said differently, the uProcessor signal conversion circuitry 1224 may receive an analog signal from the PLC and may translate this analog signal to a sequence of voltage outputs. The DC motor 1226 may be in electrical communication with the DC power source 1202 such that, in response to the voltage outputs indicative of the command from the PLC, the power source may drive the motor of the pump so as to output additive to the washing chamber. The motor of the pump may operate with pulse width modulation (PWM) in which a series of pulses are used to turn the pump on and off. In this way, the circuitry 1200 may operate to dynamically adjust the additive concentration within the washing chamber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A dishwasher comprising:
    a washing chamber configured to receive one or more items for washing therein;
    a water supply configured to supply water to the washing chamber;
    an additive supply configured to store at least one additive;
    a plurality of fluid supply lines configured to provide fluid communication between the water supply and the washing chamber and the additive supply and the washing chamber;
    one or more pumps configured to:
        direct additive stored in the additive supply to the washing chamber via at least one of the plurality of fluid supply lines; and
        direct the water from the water supply to the washing chamber via at least one of the plurality of fluid supply lines;
    a controller communicably coupled to the one or more pumps and the water supply;
    a tank sensor positioned within the washing chamber and communicably coupled to the controller, and
    an in-line sensor positioned in communication with the at least one of the plurality of fluid supply lines associated with the additive supply, comprising:
        a housing defining a conduit extending therethrough, wherein the conduit defines a length; and
        a first set of at least two electrodes spaced axially along the length of the conduit, wherein each electrode of the first set of at least two electrodes defines a cylindrical shape and extend through a wall of the conduit in a direction perpendicular to the length of the conduit, and wherein each electrode of the first set of at least two electrodes extends through an axial bore of the conduit;
    wherein the controller is configured to:
        receive a first signal from the in-line sensor;

analyze the first signal from the in-line sensor to identify a presence of detergent within the at least one of the plurality of fluid supply lines;

receive a second signal from the tank sensor;

analyze the second signal from the tank sensor to determine an additive concentration within the washing chamber;

in an instance in which the additive concentration fails to satisfy a minimum concentration threshold, cause additive to be added to the washing chamber, and in an instance in which the additive concentration exceeds a maximum concentration threshold, cause water to be added to the washing chamber.

2. The dishwasher according to claim 1, wherein the tank sensor further comprises a second set of at least two electrodes, wherein at least a portion of each electrode of the second set of at least two electrodes is located within the washing chamber.

3. The dishwasher according to claim 2, wherein the second signal is generated by the tank sensor in response to an excitation signal supplied to the second set of at least two electrodes such that a current is configured to flow between the second set of at least two electrodes in an instance in which a conductive fluid is present between the second set of at least two electrodes.

4. The dishwasher according to claim 3, wherein the excitation signal is a modified sine wave signal.

5. The dishwasher according to claim 3, wherein the excitation signal is a bipolar square wave signal.

6. The dishwasher according to claim 1, further comprising signal conditioning circuitry communicably coupled with the controller configured to rectify an alternating current (AC) signal received from the tank sensor to a direct current (DC) signal for transmission to the controller.

7. The dishwasher according to claim 6, wherein the signal conditioning circuitry is configured to direct a modified sine wave excitation signal to the tank sensor.

8. The dishwasher according to claim 1, wherein the washing chamber, the water supply, the additive supply, the plurality of fluid supply lines, the one or more pumps, the controller, and the tank sensor are each formed integral to the dishwasher.

9. The dishwasher according to claim 1, further comprising a second housing.

10. The dishwasher according to claim 9, wherein the washing chamber, the additive supply, at least a portion of the plurality of fluid supply lines, the one or more pumps, the controller, and the tank sensor are disposed within the second housing.

* * * * *

UNITED STATES PATENT AND TRADEMARK OFFICE
CERTIFICATE OF CORRECTION

| | | |
|---|---|---|
| PATENT NO. | : 12,004,696 B2 | Page 1 of 1 |
| APPLICATION NO. | : 17/012409 | |
| DATED | : June 11, 2024 | |
| INVENTOR(S) | : Nick Walker et al. | |

It is certified that error appears in the above-identified patent and that said Letters Patent is hereby corrected as shown below:

In the Claims

Column 22, Line 52, Claim 1, delete "controller," and insert -- controller; --, therefor.

Signed and Sealed this
Nineteenth Day of November, 2024

*Katherine Kelly Vidal*

Katherine Kelly Vidal
*Director of the United States Patent and Trademark Office*